United States Patent
Petruzzi et al.

(10) Patent No.: US 10,877,463 B2
(45) Date of Patent: Dec. 29, 2020

(54) SYSTEMS, METHODS, AND DEVICES FOR TOOLPATH VIRTUALIZATION AND OPTIMIZATION

(71) Applicant: D.P. TECHNOLOGY CORP., Camarillo, CA (US)

(72) Inventors: Simone Petruzzi, Montale (IT); Giuliano Sona, Poggio a Caiano (IT)

(73) Assignee: D.P. TECHNOLOGY CORP., Camarillo, CA (US)

( * ) Notice: Subject to any disclaimer, the term of this patent is extended or adjusted under 35 U.S.C. 154(b) by 28 days.

(21) Appl. No.: 16/212,466

(22) Filed: Dec. 6, 2018

(65) Prior Publication Data

US 2019/0171189 A1 Jun. 6, 2019

Related U.S. Application Data

(60) Provisional application No. 62/595,505, filed on Dec. 6, 2017.

(51) Int. Cl.
*G05B 19/00* (2006.01)
*G05B 19/416* (2006.01)
*G05B 19/4097* (2006.01)

(52) U.S. Cl.
CPC ..... *G05B 19/4163* (2013.01); *G05B 19/4097* (2013.01); *G05B 2219/35012* (2013.01); *G05B 2219/49372* (2013.01)

(58) Field of Classification Search
CPC ............ G05B 19/4163; G05B 19/4097; G05B 2219/35012; G05B 2219/49372; G05B 2219/35097
See application file for complete search history.

(56) References Cited

U.S. PATENT DOCUMENTS

| | | | | |
|---|---|---|---|---|
| 6,782,306 | B2* | 8/2004 | Yutkowitz | G05B 19/4103 700/159 |
| 7,450,127 | B2* | 11/2008 | Hong | G05B 19/41 318/569 |
| 9,104,192 | B2* | 8/2015 | Brand | G05B 19/31 |
| 2003/0033050 | A1* | 2/2003 | Yutkowitz | G05B 19/4103 700/189 |
| 2007/0225139 | A1* | 9/2007 | Kojima | B23Q 3/15706 483/1 |
| 2011/0287692 | A1* | 11/2011 | Erichsen | B24C 1/045 451/5 |
| 2017/0308058 | A1* | 10/2017 | Kreidler | G05B 19/4069 |

OTHER PUBLICATIONS

Beudaert, Xavier, Sylvain Lavernhe, and Christophe Tournier. "Feedrate interpolation with axis jerk constraints on 5-axis NURBS and G1 tool path." International Journal of Machine Tools and Manufacture 57 (2012): 73-82. (Year: 2012).*

* cited by examiner

*Primary Examiner* — Michael D Masinick
(74) *Attorney, Agent, or Firm* — Concept IP LLP; Pejman Yedidsion

(57) ABSTRACT

Methods, systems, and devices for determining an optimized toolpath in a computer-aided manufacturing (CAM) system, wherein the optimized toolpath comprises a toolpath associated with a part of a workpiece and wherein the optimized toolpath is configured for a computer numerical control (CNC) machine.

14 Claims, 26 Drawing Sheets

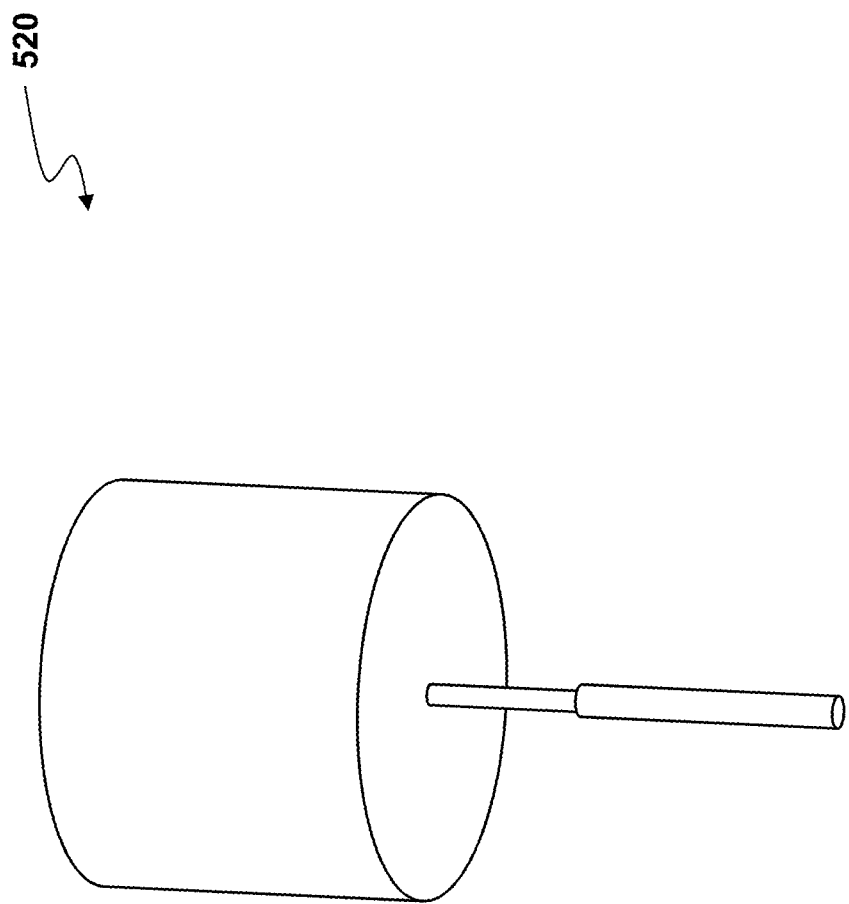

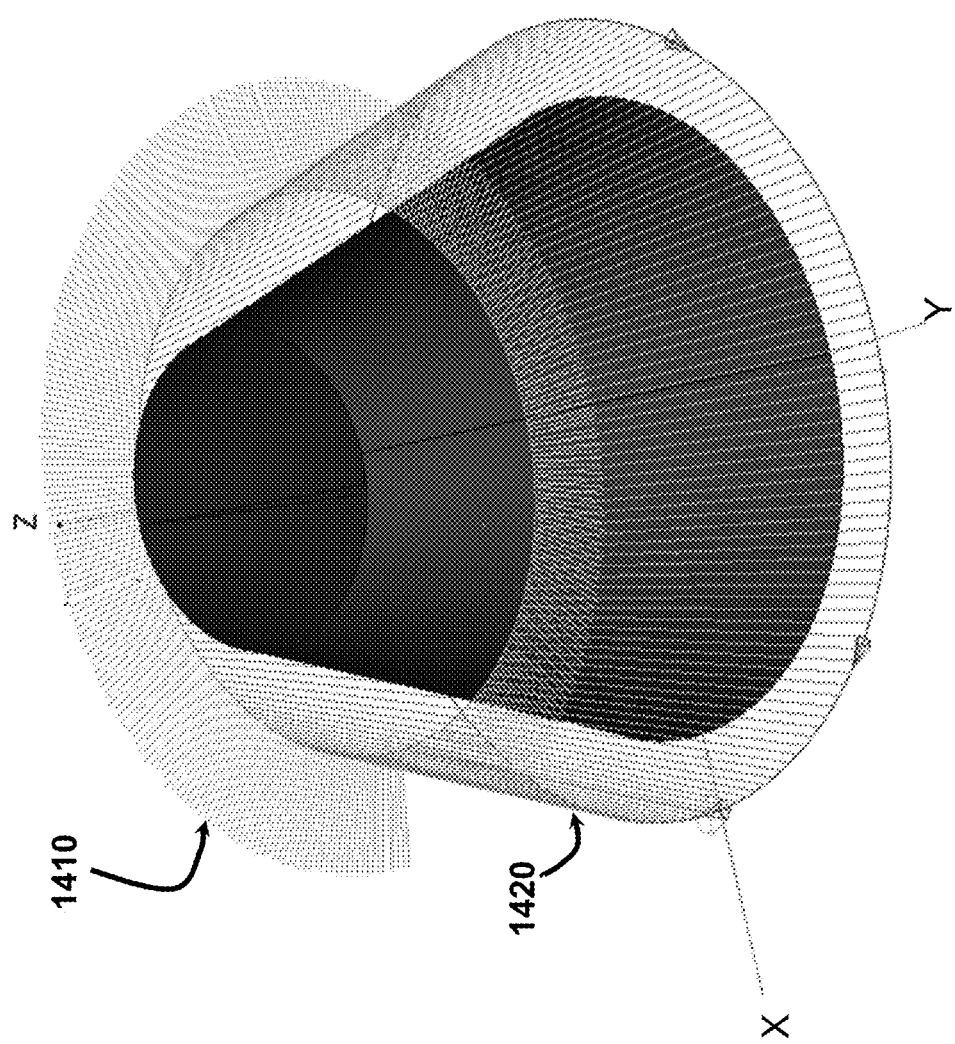

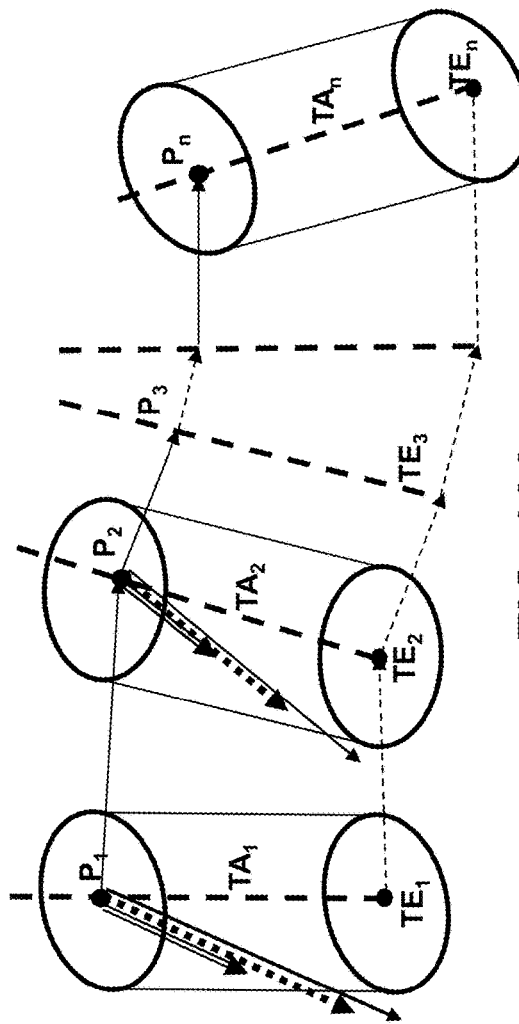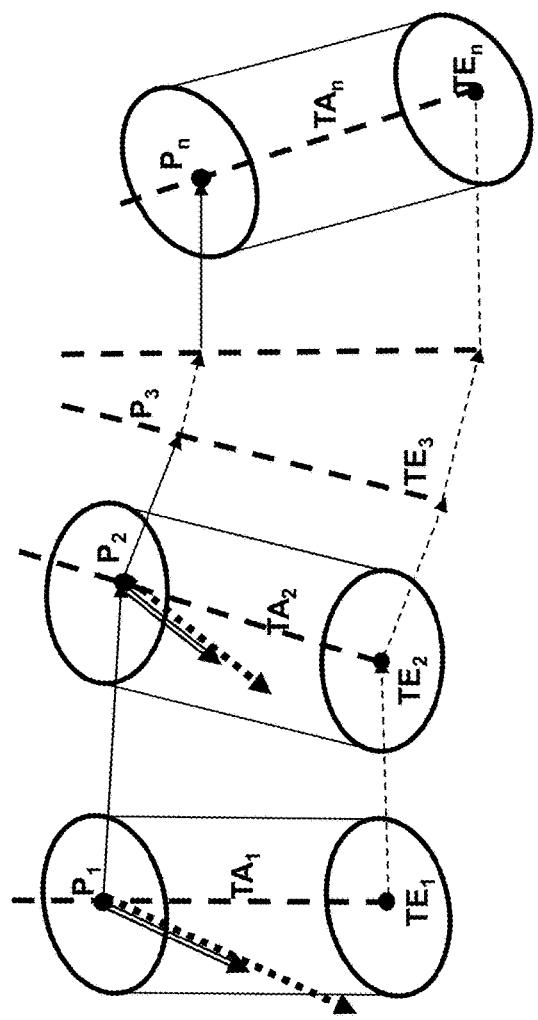
FIG. 16A
FIG. 16B

SYSTEMS, METHODS, AND DEVICES FOR TOOLPATH VIRTUALIZATION AND OPTIMIZATION

TECHNICAL FIELD

The invention in its several embodiments relates generally to the optimization of machine tool program generation by means of CAM systems and machine tool axes control by means of CNC Controllers using kinematic properties of the tool and the toolpath.

BACKGROUND

Computer-aided manufacturing (CAM) systems generate a set of instructions for computer numerical control (CNC) machine tools. Such instructions drive cutting tools along complex paths in order to obtain desired model shapes by carving blocks of stock materials. Such cutting operations are known as manufacturing cycles, where initially a block of stock material is milled into a target shape to be obtained by the cutting operations of the CNC machine.

Typically, instructions are grouped into cutting operations, or sequences that are applicable to a specific geometric feature of the part, and utilize a particular machining strategy and cutting tool. By and large, most CAM solutions employ the use of computer-aided design (CAD) models of the part to facilitate the creation of cutting operations, i.e., the relative movement between a workpiece and the cutting tool, commonly referred to as "toolpaths." Utilizing virtualization models allows precise indications regarding the quality of manufacturing and the part finishing before actual cutting operations. Toolpaths may be calculated with greater precision and in a manner which avoids gouging or otherwise damaging the workpiece. Additionally, the user may become aware of the aforementioned problems before the cutting operation where the simulation may have detected such problems at an early phase of the milling process, e.g., before the cutting operation.

A toolpath is in principle a "tool motion" or a sequence of elementary motions, and therefore it is linked with the machine geometry and the machine physical limits. All machines have areas or directions where the toolpath may be difficult and in certain circumstances a toolpath may not be independently generated from a machine. Many CNC parameters are necessary to be set since changes in speed, velocity, angle, etc. of the milling tool all affect the quality of manufacturing. The simulation process is important and useful only if it comes as close to being identical to the CNC system on the machine during the physical cutting phase. Accordingly, determining and displaying such factors in a 3D environment is needed in order to assist the operator with the milling simulation.

SUMMARY

Embodiments may include a computer numerically controlled (CNC) system having: a Computer-Aided Manufacturing (CAM) controller and a CNC controller. In some embodiments, the CAM controller may be configured to determine, by the CAM processor and memory, at least one of: pivot, velocity, acceleration, and jerk. In additional embodiments, the CNC controller may be configured to control, by the CAM, at least one of: a tool speed, a tool feed, and a tool acceleration based on the determined pivot, velocity, acceleration, and jerk. In additional embodiments, at least one parameter in the CAM controller corresponds to at least one machine parameter of the CNC controller. That is, the CNC controller may be further configured to be optimized in a 5-axis toolpath via determining pivot velocity vectors and further by displaying a real-time visualization of geometry-related kinematic data associated with the toolpath strategy.

A method embodiment for determining an optimized toolpath in a computer-aided manufacturing (CAM) system is disclosed where the optimized toolpath may comprise a toolpath associated with a part of a workpiece and where the optimized toolpath may be configured for a computer numerical control (CNC) machine, the method having: determining a set of parameters associated with a cutting tool of the CNC machine, the set of parameters having pivot, velocity, accelerations, and jerk, where the determining is based on kinematic properties of a cutting tool of the CNC machine and a toolpath, where the kinematic properties of the cutting tool are based on an associated tool end, tool length, and tool axis; determining a cutting tool positioning and a cutting tool movement for performing a machine operation, where the determining of the cutting tool positioning and the cutting tool movement is based on the determined set of parameters associated with the CNC machine; performing a capability check for the cutting tool positioning and the cutting tool movement based on capabilities of the CNC machine and the cutting tool; determining an optimized toolpath having a consistent motion of the cutting tool based on the performed capability check and adjusting one or more of the set of parameters, where the optimized toolpath is based on the jerk of the cutting tool being below a threshold; and transmitting the determined optimized toolpath for generating the machine operation in the CNC machine.

The method may further comprise: providing precise indications about the quality of manufacturing and part finishing. Additionally, the pivot may be determined based on a tool end, cutting tool length, and axial inclination of the cutting tool. In one embodiment, a pivot displacement is the difference between a current pivot and a previous pivot; a tool end displacement is the difference between a current tool end and a previous tool end; the velocity is determined based on a ratio of the length of the pivot displacement and the tool end displacement.

The method may further have a set of optimization rules from at least one of: (1) a set of rules to minimize tool velocity, (2) a set of rules to minimize tool jerk, and (3) a set of rules to minimize tool acceleration. The method may further comprise: performing the generated machine operation by the CNC machine, and may be based on a successful determination of the optimized toolpath.

A device embodiment may comprise: a processor and addressable memory, the processor configured to: determine a set of parameters associated with a computer numerical control (CNC) machine, the set of parameters having pivot, velocity, accelerations, and jerk, where the determining is based on kinematic properties of a cutting tool of the CNC machine and a toolpath, where the kinematic properties of the cutting tool are based on an associated tool end, tool length, and tool axis; determine a cutting tool positioning and a cutting tool movement for performing a machine operation, where the determining of the cutting tool positioning and the cutting tool movement is based on the determined set of parameters associated with the CNC machine; perform a capability check for the cutting tool positioning and the cutting tool movement based on capabilities of the CNC machine and the cutting tool; determine an optimized toolpath having a consistent motion of the cutting tool based on the performed capability check and adjusting one or more of the set of parameters, where the optimized toolpath is based on the jerk of the cutting tool being below a threshold; and transmit the determined optimized toolpath for generating the machine operation in the CNC machine.

A system embodiment may have a computer-aided manufacturing (CAM) system having a virtual machine toolpath optimization component and a positioning movement component, each having a processor and addressable memory; where the positioning movement component processor may be configured to: determining a set of parameters associated with a computer numerical control (CNC) machine, the set of parameters having pivot, velocity, accelerations, and jerk, where the determining is based on kinematic properties of a cutting tool of the CNC machine and a toolpath, where the kinematic properties of the cutting tool are based on an associated tool end, tool length, and tool axis; and determining a cutting tool positioning and a cutting tool movement for performing a machine operation, where the determining of the cutting tool positioning and the cutting tool movement is based on the determined set of parameters associated with the CNC machine; and where, the virtual machine toolpath optimization component processor may be configured to: perform a capability check for the cutting tool positioning and the cutting tool movement based on capabilities of the CNC machine and the cutting tool; determine an optimized toolpath having a consistent motion of the cutting tool based on the performed capability check and adjusting one or more of the set of parameters, where the optimized toolpath is based on the jerk of the cutting tool being below a maximum threshold; and transmit the determined optimized toolpath for generating the machine operation in the CNC machine.

The CAM system may further comprise: a toolpath virtualization and optimization system, where the toolpath virtualization and optimization system may be configured to: determine an optimized toolpath in the CAM system, where the optimized toolpath comprises a toolpath associated with a part of a workpiece and where the optimized toolpath may be configured for CNC machine.

BRIEF DESCRIPTION OF DRAWINGS

Embodiments may be illustrated by way of example and not limitation in the figures of the accompanying drawings, and in which:

FIGS. 5A-5B illustrate a cutting tool and a piece that needs to be cut;

FIG. 14 illustrates the pivot velocity vectors as determined based on visualization of related kinematic data;

FIGS. 16A-16B show the velocity vectors, acceleration vectors, and jerk vectors;

DETAILED DESCRIPTION

Figure 1:
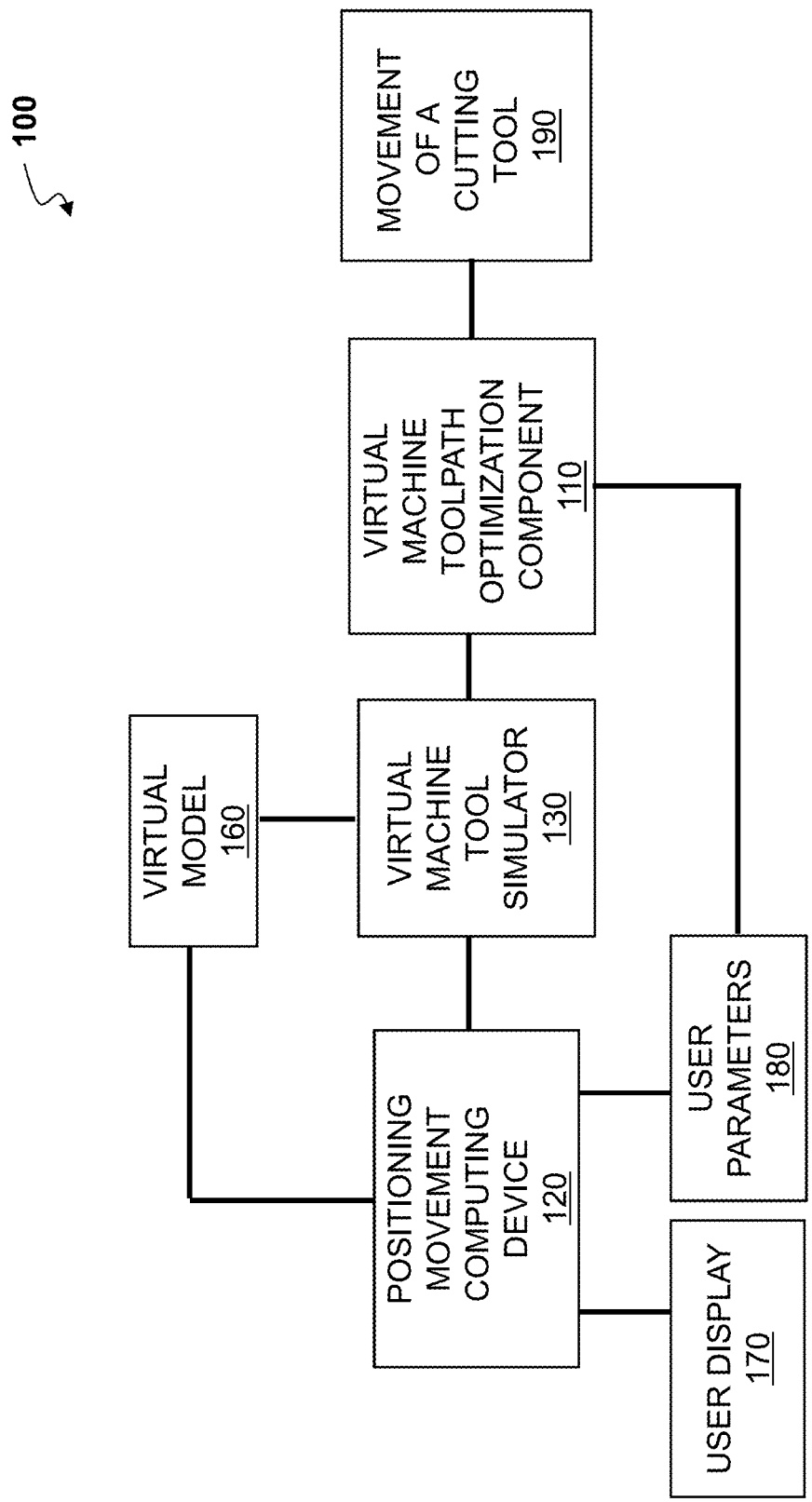
FIG. 1 depicts in a functional block diagram a toolpath virtualization and optimization system.

Computer-aided manufacturing (CAM) computing systems generate, with a high degree of automation, instructions for accurate and efficient cutting operations or machine tasks by using information available from simulated versions of parts, workpieces, and machine tools and its constituents. Embodiments of a toolpath virtualization and optimization system and computing devices may facilitate the simulation and visualization of the toolpath, where the toolpath for the milling machine comprises/signifies each tool motion defined by a cutting tool.

In this application velocity, acceleration, and jerk are referred to as a ratios of a length with dimensions of length, length$^2$, or length$^3$ instead of ratios of a length with dimensions of time, time$^2$, or time$^3$. A cycle may be defined as a sequentially ordered set of geometric, logic, and technologic rules that produces a consistent motion of a Cutting Tool (CT) along the workpiece. The type of motion is used to distinguish one cycle from another. For example, in 3-axis cycles, the CT inclination is constant and the motion of a single point is sufficient to describe the cycle. In 4-axis cycles, the CT inclination may vary with one degree of freedom. In 5-axis cycles—currently the most complex—the CT inclination may virtually assume any direction in 3D space (compatible with the physical limits of the milling machine), and is governed by two parameters: (1) a 3D reference point (usually called tool end, TE); and (2) a 3D unit norm direction (usually called tool axis, TA). The pair (TE,TA) may then define a cutter-location (CL), and an ordered sequence of CLs may then form a 5-axis toolpath. In mathematical formalism a CL may be represented by:

$$CL = \begin{cases} TE = (TE_x, TE_y, TE_z) \\ TA = (TA_x, TA_y, TA_z) \end{cases}$$

where $$(TA_x)^2 + (TA_y)^2 + (TA_z)^2 = 1$$

or equivalently $$TA = (\cos\varphi\sin\theta, \sin\varphi\sin\theta, \cos\theta)$$

with $$0 \le \varphi < 2\pi, 0 \le \theta \le \pi$$

In one embodiment of the toolpath virtualization and optimization system and computing devices, velocity, acceleration, and jerk may be considered quantities defined as functions of relative positions of specific points of the CT. A visualization method may be implemented for toolpath optimization in a 5-axis cycle where pivot, velocity, acceleration, and jerk are a concern. A threshold may be determined for scenarios where jerk may exceed a maximum value and, for example, illustrated by a long arrow in the pivot point where such large jerk value has occurred. Embodiments of the present application allow for notification of a dangerous point of the toolpath to the user when the order of magnitude of the jerk value is beyond the maximal threshold, where the threshold may be determined based on the specific milling machine and the ability of the milling machine to sustain the motion.

In some embodiments, CAM computing systems comprise a virtual machine toolpath optimization component to generate simulated versions of parts, workpieces, and especially machine tools in the toolpath optimization. Specifically, motions of the cutting tool may be optimized and made reliable, via virtual machine tool models having information, such as a machine's kinematics or a machine's controller specifications to create smooth motions having reduced jerk, where the smooth motions may depend on the user desire and machine capabilities. Some embodiments of the virtual machine toolpath optimization component determine cutting tool positioning and movement during cutting and/or non-cutting machine processes on a machine tool which may be characterized by, for example, toolpath virtualization and optimization.

An example of a CAM system may comprise the virtual machine toolpath optimization component disclosed herein to create positioning motions that are optimal and do not result in undesired contact or velocity with and around the workpiece or machine tool components. In some embodiments, positioning and movement by the cutting tool may depend on pivot, velocity, acceleration, and jerk of the cutting tool, where such parameters may depend on the tool end, tool length, and tool axis to further optimize the toolpaths. The system and operator of the machine need to take into consideration velocity and acceleration of the cutting tool during operations.

Accordingly, the virtual machine toolpath optimization component may determine such parameters and the resulting parameters for the toolpath may be communicated to a user or machine operator by the virtual machine toolpath optimization component. Within a CAM system, the virtual machine toolpath optimization component may also transmit such information to a positioning movement computing device to be used in the toolpath optimization process. In some CAM systems, via positioning movement computing devices, a virtual representation of machine tool movement and other components may be utilized. In some embodiments, virtual models of machine tool movements may be used by the CAM system to generate operations which are even more suitable for the desired machine, for example, within machine axis limits, as well as free of collisions or undesired contact with any workpiece or machine components. Additionally, the virtual models may give the tool-motion shape characteristics that make it more compliant with the differential properties of the target surface. Furthermore, virtual models may be used to simulate the resulting machining operations to ensure accurate and collision-free results which operate within the machine and cutting tool's capabilities.

Aspects of the present embodiments may determine shape and differential properties of the cutting tool based on a change in concavity of the toolpath. It is presented that changes in concavity of the target surface may cause dangerous points in the cutting and according to the present embodiments, the system may determine and illustrate/show the larger acceleration and larger jerk that result in poor quality of finishing. Since a toolpath is calculated by taking into account all the features of the shape of the target model for the part that must be manufactured, such a shape is usually provided to the CAM software by surface mathematical equations within a CAD file; such equations allow evaluation of the so-called differential properties of the part-surfaces. That is, differential properties rely on the mathematical notion of derivative or differentiation, e.g., the ratio of infinitesimal rates of change. Among those differential properties, the changes in concavity/convexity of the part surfaces may experimentally negatively affect a toolpath, producing large accelerations and/or jerks in specific points of the toolpath.

The present embodiments of the toolpath virtualization and optimization system provide the CAM system and end-user with a tool for early detection (for example, at simulation phase and before feeding the toolpath to the CNC machine and manufacture for cutting) of such large accelerations and/or jerks. Since large accelerations and/or jerks would typically result in poor finishing quality, the toolpath virtualization and optimization system may provide a tool to enable users to modify parameters, e.g., technological or geometrical, involved in toolpath calculation in order to recalculate a new toolpath with smoother characteristics, e.g., smaller jerk/velocity/acceleration. Embodiments of the toolpath virtualization and optimization system may be implemented in the CAM and/or at the CNC machine controller providing real-time information of the operations.

The determining of pivot, velocity, acceleration, and jerk may be by the virtual machine toolpath optimization component and based in part on the cutting tool length of the cutting tool, where every cutting tool has an associated cutting length value. Additionally, the pivot, velocity, acceleration, and jerk may be determined further based on the tool end (TE) and tool axis (TA). All directions/positions/inclinations are intended to be evaluated with respect to a fixed or orthonormal reference frame, which may be jointly liable or in agreement with the target. In one embodiment, the cutting length of a cutting tool CT may be an absolute value that does not depend on the TE and TA. However, the length of the CT, the TE, and TA may be interrelated in the sense that some inclinations of the CT may lead to more tool engagement than others. That is, the cutting length may be defined as the extension along the cutter of the portion of tool that has cutting ability.

In one embodiment of the CAM system, the virtual machine toolpath optimization component may determine the pivot, velocity, acceleration, and jerk between or within operations which may be: machining operations that may be defined as operations in which a cutting tool is removing material on a specific geometric feature of the part; specific groupings of toolpath elements, which may comprise some portion of a machining operation; and optionally, non-cutting operations. In some embodiments, the virtualization of the cutting tool movement may comprise a definition of each motion axis on the cutting tool at each of the: tool end, tool axis, and pivot point. The virtualization may also provide the position, velocity, and acceleration limits of each axis, so that the positioning movement computing device may choose the best available axis and speed for the cutting tool at that axis. Similarly, in another aspect of the present embodiments, a virtual machine controller may allow the machine tool model to accurately emulate its real-world counterpart based on the received data from the virtual machine toolpath optimization component. The virtual machine controller may then provide the machine tool model used by the CAM system. In one embodiment, the virtualization and optimization are automatically and dynamically determined, displayed for a user, and/or created for the CAM program.

In one embodiment, the virtual machine toolpath optimization component may determine velocity that may be a ratio of the length of a pivot displacement and tool end displacement, where the pivot may be determined based on a tool end and cutting tool length and axial inclination of the cutting tool. In this embodiment, the tool vector may be normalized using a unit norm vector, i.e., tool axis, where the vector representing the inclination of the tool axis is normalized. Accordingly, a relative velocity of the pivot and the tool end may be in the form of a numeric value and the velocity is a positive value. Once a velocity is determined, the virtual machine toolpath optimization component may then associate each of the velocity values with a direction in 3D space. The direction may be based on a tool end and tool axis set of vectors as noted in the figures. Accordingly, the virtual machine toolpath optimization component determines a set of parameters that are dependent on the kinematic properties of the tool and the toolpath used in a milling operation. In some embodiments, the parameters may also be visually displayed in a diagram displaying, in the same 3D environment, in which the result of the milling simulation are reported and depicted in the simulation. That is, the importance of displaying such determined information lies in the fact that these parameters, embodied in vectors orthogonal to the tool trajectory, and having variable length, may provide precise indications about the quality of the manufacturing and the part finishing. Additionally, the determined information may provide indications about the smoothness of the motion of the CNC machine axes thereby the system may use these indicators and recalculate the cycle, especially if there is jerk in the tool motion—where the jerk is larger than a threshold which may cause issues with the cutting—in order to get the jerk to be smaller values that are within set limits.

FIG. 1 depicts in a functional block diagram, an embodiment of the CAM system 100, where the system may comprise: a virtual machine toolpath optimization component 110, a positioning movement computing device 120 or component, e.g., a link move calculator, and a virtual machine tool simulator 130, each associated with a computer numerical control (CNC) machine tool. The positioning movement computing device 120 may receive, from the CAM system, a virtual model 160 of the CNC machine, where the virtual model 160 may comprise a representation of a machine tool and a set of machine tool components, and where the virtual representation of the machine tool may further comprise a set of kinematic constraints associated with the CNC machine tool. In one embodiment, the virtual machine tool simulator 130 may receive input signals from the virtual model 160. In one embodiment, each positioning instruction or tool motion may be configured to the specific kinematics of the machine tool, as well as the controller of that machine tool, and optionally, based on the workpiece. The virtual model 160 may be modified and in a iterative loop updated based on additional information received from the virtual machine tool simulator 130 and fed back into the positioning movement computing device 120, in affect creating a hysteresis where the state of the system has a dependence on its history.

The CAM system 100 of FIG. 1 may utilize a virtual machine model 160 that includes: a kinematic definition of the machine and a logical description of the machine tool's controller, whereby the virtual machine tool simulator 130 may transmit or provide input to the virtual machine toolpath optimization component 110. An embodiment of a virtual model 160 may comprise solid representations of objects which may be used in the manufacturing process of a part, including, for example, machine tools, fixtures, parts, stocks, tools, and holders. The positioning movement computing device 120 may send a virtual machine tool simulation to the virtual machine tool simulator 130 where the virtual machine tool simulation is based on determined parameters by the virtual machine toolpath optimization component 110, the parameters comprising any jerk motion associated with the cutting tool. Accordingly, any jerk motion of the cutting tool may be determined and displayed utilizing pivot velocity and pivot acceleration vectors to determine an optimized cutting tool movement 190. That is, each cutting tool movement and machine positioning movement may be computed based on a virtual model of the machine tool and automatically or dynamically optimized by the CAM system. Additionally, via a user display 170, visualization for toolpath optimization may be presented to a machine operator or user whereby the machine operator may provide user parameters 180 to further optimize the movement of the cutting tool 190. The user may provide the user parameters 180 to the positioning movement computing device 120 or in some embodiments to the virtual machine toolpath optimization component 110.

Figure 2:
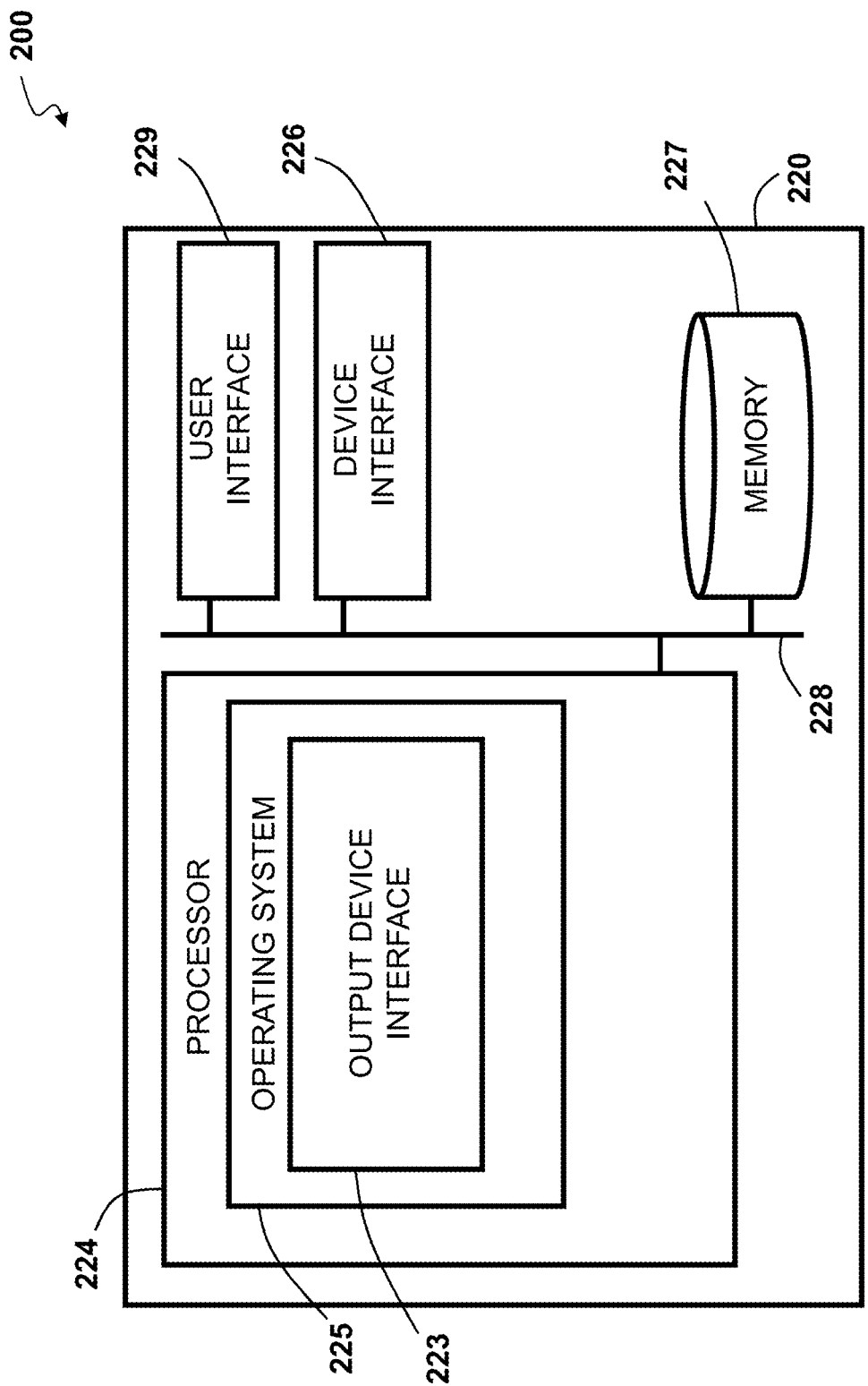
FIG. 2 illustrates a top level functional block diagram of a CAM system having a positioning movement computing device.

FIG. 2 illustrates an example top level functional block diagram of a CAM system having a positioning movement computing device embodiment with a virtual machine toolpath optimization component 200. The operating environment is shown as a computing device 220 comprising a processor 224, such as a central processing unit (CPU); an addressable memory 227, such as a lookup table, e.g., an array; an external device interface 226, e.g., an optional universal serial bus port and related processing, and/or an Ethernet port and related processing; an output device interface 223; and an optional user interface 229, e.g., an array of status lights, and one or more toggle switches, and/or a display, and/or a keyboard and/or a pointer-mouse system and/or a touch screen. Optionally, the addressable memory may, for example, be: flash memory, SSD, EPROM, and/or a disk drive and/or another storage medium. These elements may be in communication with one another via a data bus 228. An operating system 225, such as one supporting the execution of applications, may comprise a processor 224 which may be configured to execute steps of a toolpath virtualization and optimization to determine an optimized movement of a cutting tool based on a received virtual model, the virtual model comprising parameters for pivot, velocity, acceleration, and jerk, as determined by the virtual machine toolpath optimization component and based on a set of objects of a machining setup.

FIGS. 3-25 depict and explain the process in which such parameters are determined and then used to provide a method for toolpath virtualization and optimization in a CAM system. In some embodiments, determined pivot, velocity, acceleration, and jerk may be checked and verified by a virtual machine toolpath optimization component. This verification ensures that the generated instructions will work on the CNC machine to avoid on-machine verification, which may result in large non-cutting times, or dead times, and may therefore be non-desirable.

Figure 3:
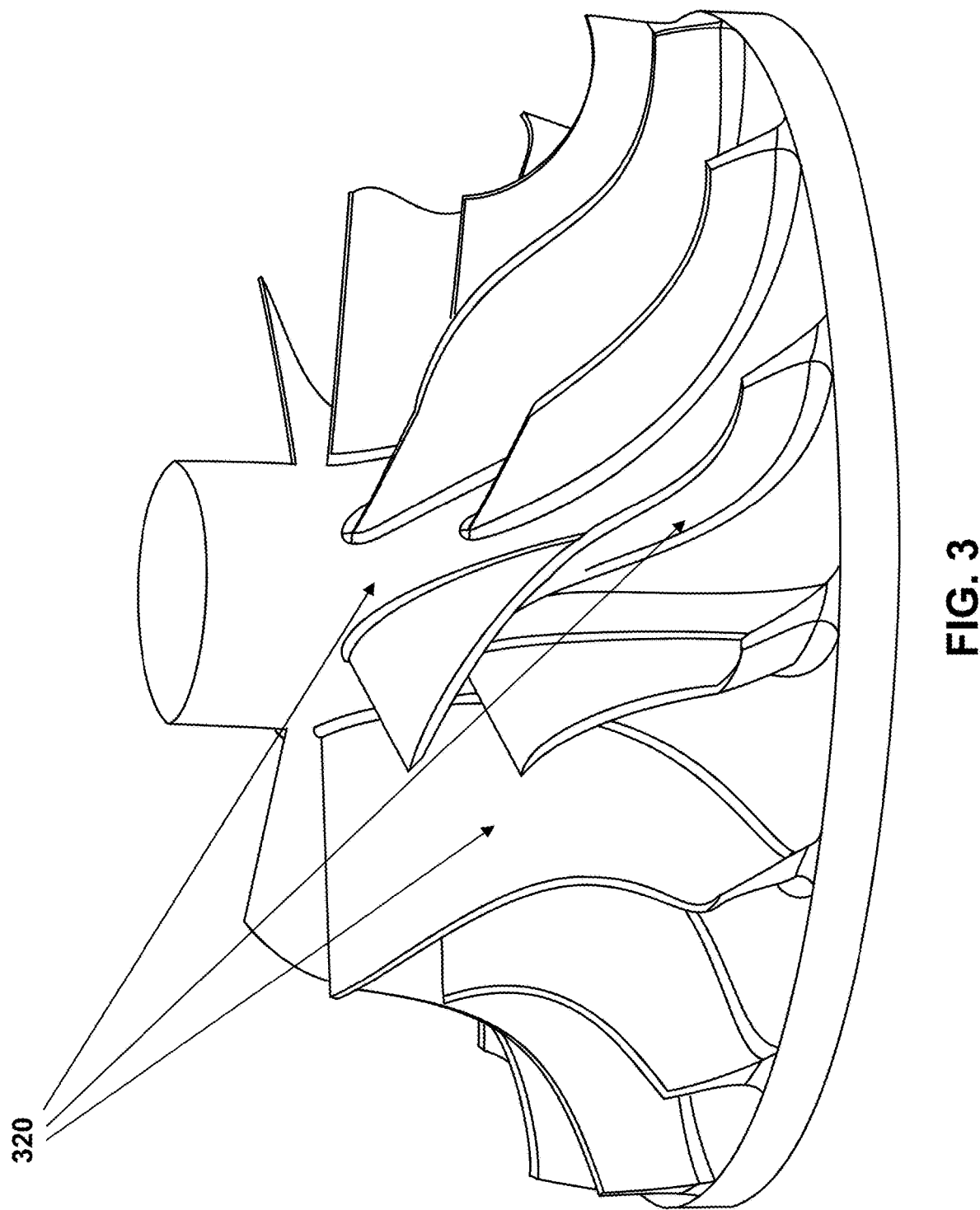
FIG. 3 illustrates a target to be worked on by the CNC machine via manufacturing cycles.
Figure 4:
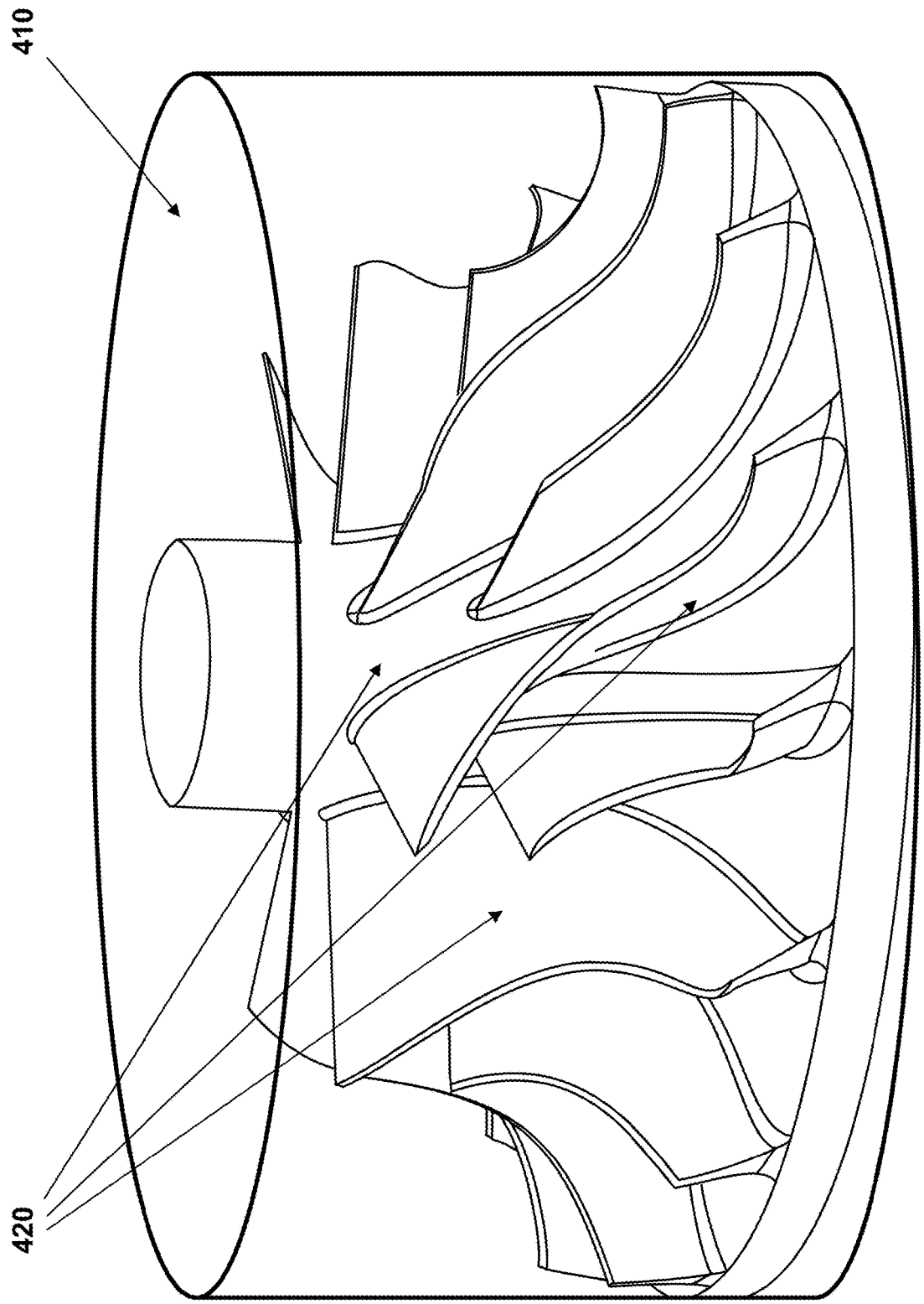
FIG. 4 illustrates the stock and a target shape that needs to be obtained via the cutting operations.

FIG. 3 illustrates a target 320 to be worked on by the CNC machine via manufacturing cycles that is needed to obtain the desired modeled shape. The CNC machine may receive instruction from a CAM software which drives the cutting tools along complex paths in order to obtain desired model shapes by carving blocks of stock materials. Such cutting operations are known as manufacturing cycles, and described further below. FIG. 4 illustrates together the stock and a target shape that needs to be obtained via the cutting operations. Further illustrated are an initial stock 410 material and the target 420 shape to be obtained by the aforementioned cutting operations on the CNC machine.

Figure 5B:
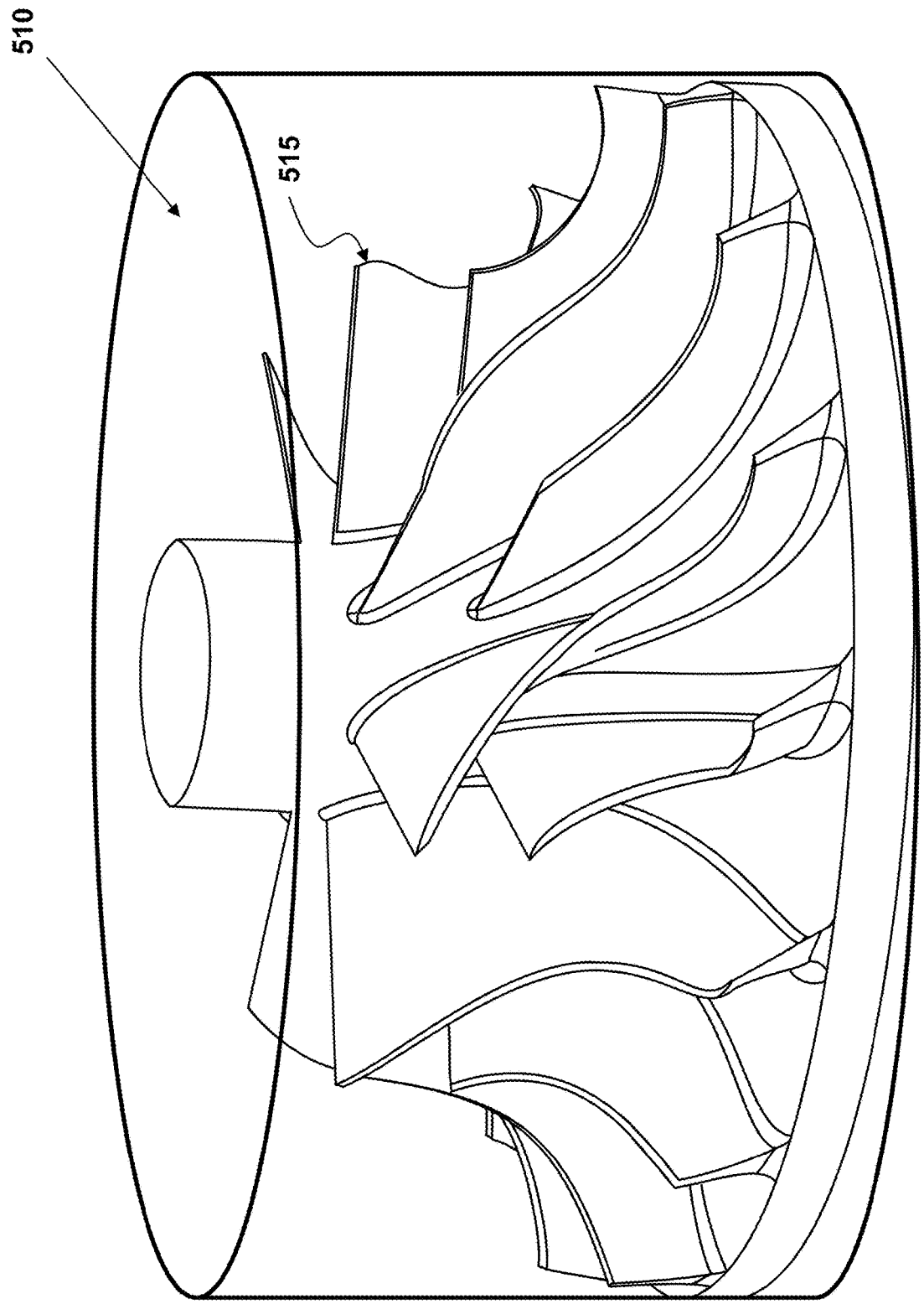

FIGS. 5A-5B illustrate a cutting tool (CT) 520 and a piece that needs to be cut where the CT 520 should carve the stock 510 but not the target model 515, which is needed to be left behind after the rough material is removed via extracting the final shape from the stock. In some embodiments, a cycle is determined and designed using and/or based on CAD models where the cycle represents a sequentially ordered set of geometric, logic, and technologic rules that produces a consistent motion of the CT along the piece being worked on. This model may be saved, along with the cycle, in a computer digital file, e.g., CAD file. In one embodiment, the type of motion distinguishes one cycle from another. For example, as discussed above, in 3 axis-cycles the CT inclination is constant and the motion of a single point is sufficient to describe the cycle. Whereas, in a 4-axis example, the CT inclination may vary with one degree of freedom, and further in 5-axis cycles the CT inclination may virtually assume any direction in 3D space. In other embodiments, the work piece may also be allotted movement and degrees of freedom where the CT is held steady. That is, in an example of orientable spindle machines, it is the CT being oriented, while in orientable table machines, it is the workpiece that is tilted while the tool remains aligned to a fixed direction in space. Accordingly, a relative inclination between the cutting tool and the workpiece, which may be referred to cutting tool orientation in any way, is considered.

Figure 6:
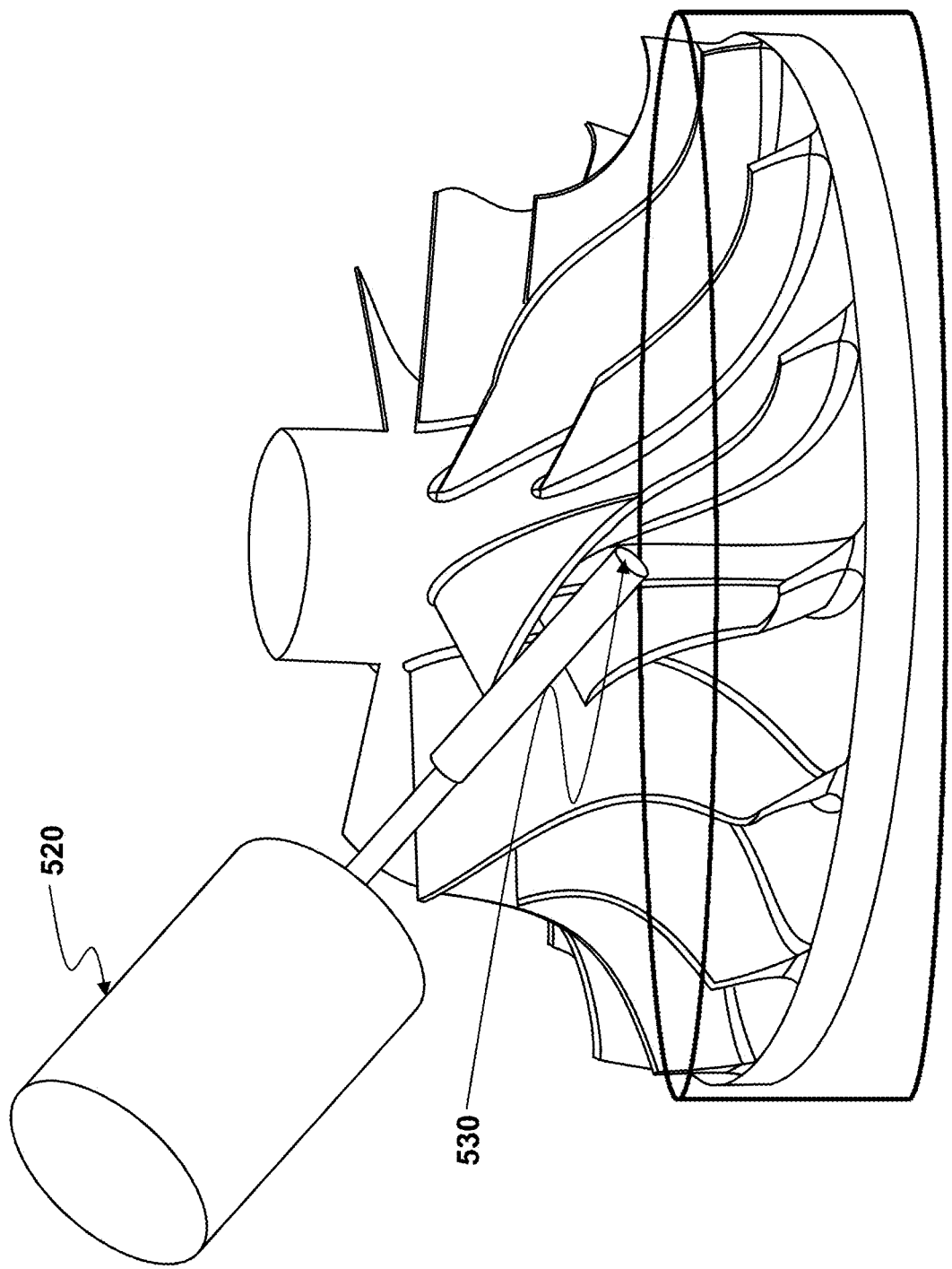
FIG. 6 illustrates the cutting tool progressively cutting away stock material along the path during various cycles.

FIG. 6 illustrates the cutting tool 520 progressively cutting away stock material along the path during various cycles, i.e., toolpaths, where the toolpath may be produced by the CAM software. As previously defined, the geometric paths followed by the CT 520 during the various cycles are known as the toolpath. Said in another way, the toolpath is the geometric path through space that the tip 530 of the CT 520 follows in order to produce the desired geometry of the workpiece. The tip position may be associated with a directional arrow issued at the point (for each tip position there should be an arrow associated with it).

Figure 7B:
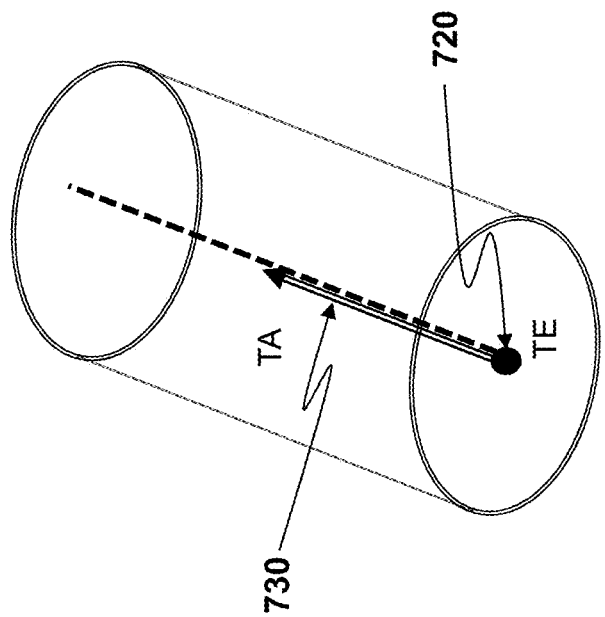
FIGS. 7A-7B illustrate a cutting tool in a cutter-location and in the 3 dimensional space.
Figure 7A:
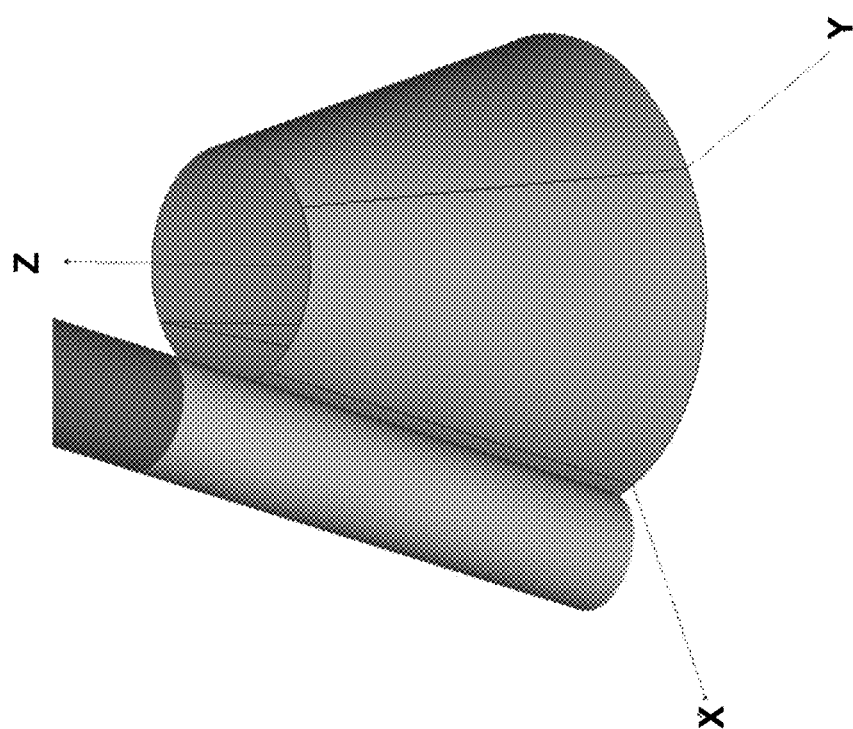

FIGS. 7A-7B illustrate a cutting tool in a cutter-location (CL) and in the 3 dimensional space having an X, Y, and Z axis (orthonormal reference frame). FIG. 7B illustrates an example tool end (TE) 720 (depicted with a filled in black circle) and a tool axis (TA) 730 coming out of the circle in the direction of an arrow (depicted in double solid black lines). The CL may be determined based on the TE and TA where in 5-axis a set of geometric attributes may comprise a reference point and a unit norm direction. That is, the pair (TE,TA) may be used to define a cutter-location and the ordered sequence of cutter-locations (for example, ranging from $10^0$ to $10^6$) forming a 5-axis toolpath. Tool motion may also be represented by kinematic data such as velocity, feedrate, and spindle parameters. However, in the different aspects of the present embodiments, such terms as velocity, acceleration, and jerk are used as quantities defined as functions of relative positions of specific points of the CT, for example, as ratios of distances between relative positions.

Figure 8:
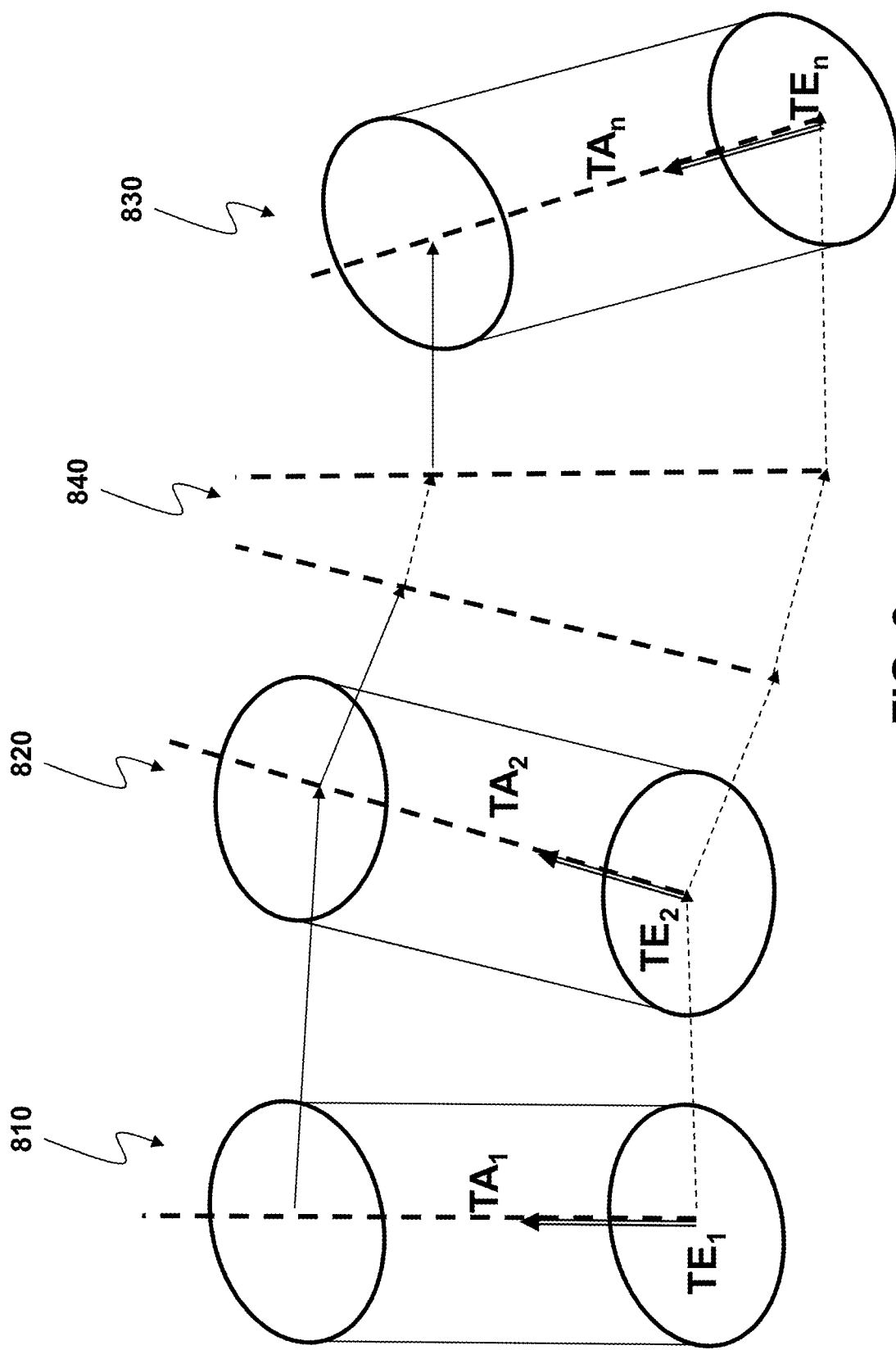
FIG. 8 illustrates a 5-axis toolpath with the cutting tool movement producing a number of cutter-locations moving through space.

FIG. 8 illustrates a 5-axis toolpath with the CT movement producing a number of cutter-locations (CL) 810,820,830, 840 and the TE and TA incrementally moving in time and space. As illustrated, other intermediate cutter-locations 840 are depicted as the cutting tool moves from location 820 to location 830. The cutting tool is depicted as going from a first CL (or position) 810, to a second CL 820, and finally to an $n^{th}$ CL 830, while having gone through a (finite arbitrary) number of intermediate CLs 840. As mentioned above, the toolpath produced by the CAM software may be used by the CNC machine at a later phase. That is, based on the complexity of the toolpath—defined as an ordered sequence of CL—the value of n in the figure may range from a few units to $10^6$.

Figure 9:
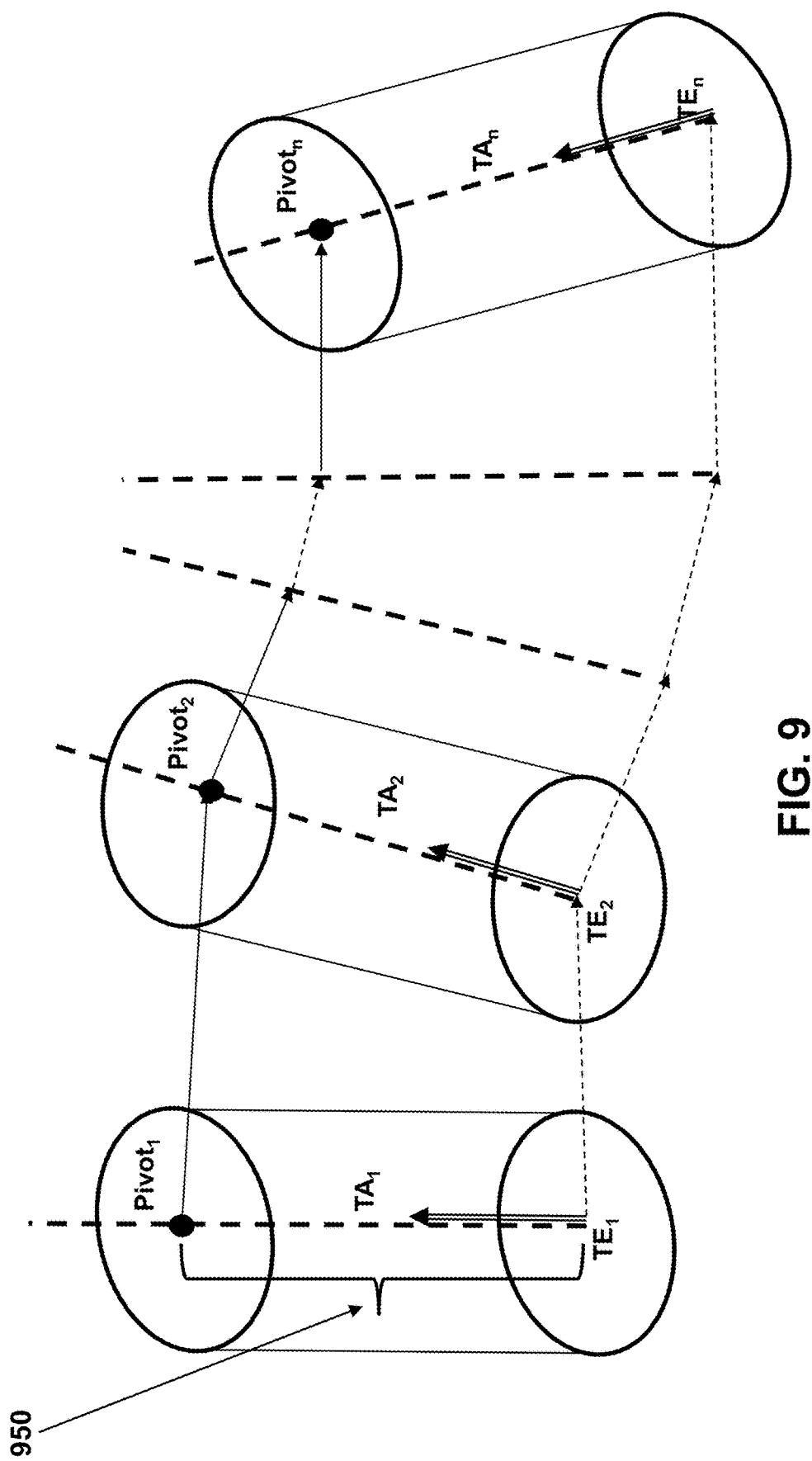
FIG. 9 illustrates the cutter locations of the cutting tool and the cutter tool length and the pivot points.

FIG. 9 illustrates the same CLs moving through space but further showing a cutting tool length (CTL) 950 that is associated with each CL and is in addition to showing the CLs 1, 2, . . . , n. The cutting tool length is a positive value (representing the axial portion of the tool that is able to perform cutting functions) and the TE and TA (a unit norm vector) are shown as before in FIG. 8, but now with a measured cutting length value (or CTL). A pivot may be determined for each CL of the CT which is based on the CTL. So each CTL value is used to adjust the TA and then added to the TE to determine the pivot for each CL, for example: Pivot$_1$, Pivot$_2$, . . . , Pivot$_n$. The CT has an associated (positive) cutting tool length CTL value where the CTL is a length measured from the TE along the TA, yielding another characteristic point of the CL, which is referred to as the Pivot. A mathematical notation for pivot may be represented as TE+CTL*TA, where for the j-th CL: Pivotj=TEj+CTL*TAj j=1, 2, . . . , n.

Figure 10:
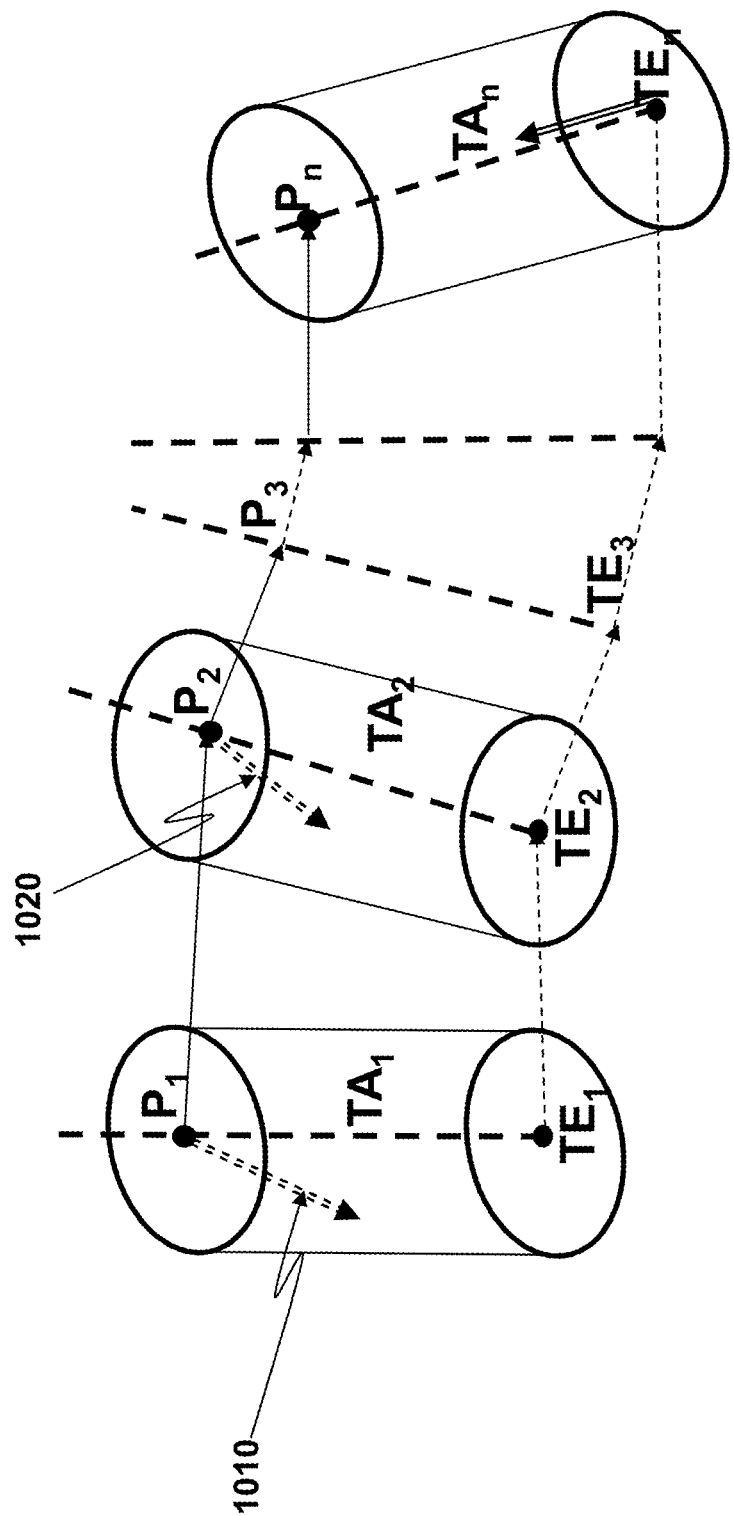
FIG. 10 illustrates the cutter locations of the cutting tool and the corresponding velocity vectors.

FIG. 10 illustrates the cutter locations of the CT and the CTL as a fixed constant value which may be used to determine a velocity of each pivot. Accordingly, a velocity scalar value may be based on the module of the difference vector between two adjacent pivots (e.g., $|P_2-P_1|$) and the module of the difference vector of the same two adjacent tool ends (e.g., $|TE_2-TE_1|$). That is, a velocity—always a positive value—for a particular cutter location of the cutting tool may be based on the determined pivot of the subsequent location and the pivot of the current location, along with the TE of the subsequent location and the TE of the current location, as depicted in the example formulas presented in this figure.

Since CTL is a fixed constant positive value, the j-th CL (TE$_j$,TA$_j$) can also be described as (TE$_j$,Pivot$_j$), or simply (TE$_j$,P$_j$): TE$_j$, P$_j$ are 3D points, and we denote the length of the 3D segment from TE$_j$ to TE$_{j+1}$ by $|TE_{j+1}-TE_j|$ (and similarly for P$_j$ and P$_{j+1}$) In addition, the scalar quantity may be associated to the first pair (TE$_1$,P$_1$)

$V_1=|P_2-P_1|/|TE_2-TE_j|$ where the scalar value $V_1$ may be the velocity of Pivot$_1$ with respect to the corresponding TE$_1$ More in general, the below is defined $V_j=|P_{j+1}-P_j|/|TE_{j+1}-TE_j|$ as the velocity of Pivot$_j$ with respect to the corresponding TE$_j$ (j=1, 2, . . . , n-1)

FIG. 10 further illustrates the cutter locations of the CT and the CTL where the velocity 1010,1020 at each CL is associated with a direction in 3D space. This direction may be represented as ω and as a unit norm vector. The direction may be determined based on the TE at each subsequent CL and a current CL along with the TA at the current CL. A set of pivot velocity vectors may then be determined to represent or provide the characterization of the relative displacement of the pivots with respect to the tool ends.

In some embodiments, the user display of the system may display graphically the numerical values V1, V2, ..., Vn defined previously to associate each of them with a direction in the 3D space. The direction $\omega j$ may be associated with the value Vj as: $\omega j = \Omega j/|\Omega j|$ where $\Omega j = (TEj+1-TE_j)\char`^TAj$ for $j=1, 2, \ldots, n-1$ (the symbol $\char`^$ denotes the cross product between 3D vectors): the $\omega j$ may be defined to be unit norm vector, in the case where the two vectors involved in the cross product should be parallel then, the $\omega j$ may be defined to be a zero vector.

The vector $Wj=Vj*\omega j$, issued in "Pj", has a length which is equal to the scalar value Vj: it will be displayed as a visual measure of the relative motion of the pivot point "Pj" with respect to the tool end TEj: the vectors W1 and W2 are shown issued respectively in "P1", "P2". The Wj may be called "Pivot velocity vectors" although, they do not represent a velocity in the strict physical sense, but rather a characterization of the relative displacement of the pivots with respect to the tool ends. It may be noted that the choice $\Omega j=(TEj+1-TEj)\char`^TAj$ guarantees that Wj lies orthogonally to "TAj"

Figure 11:
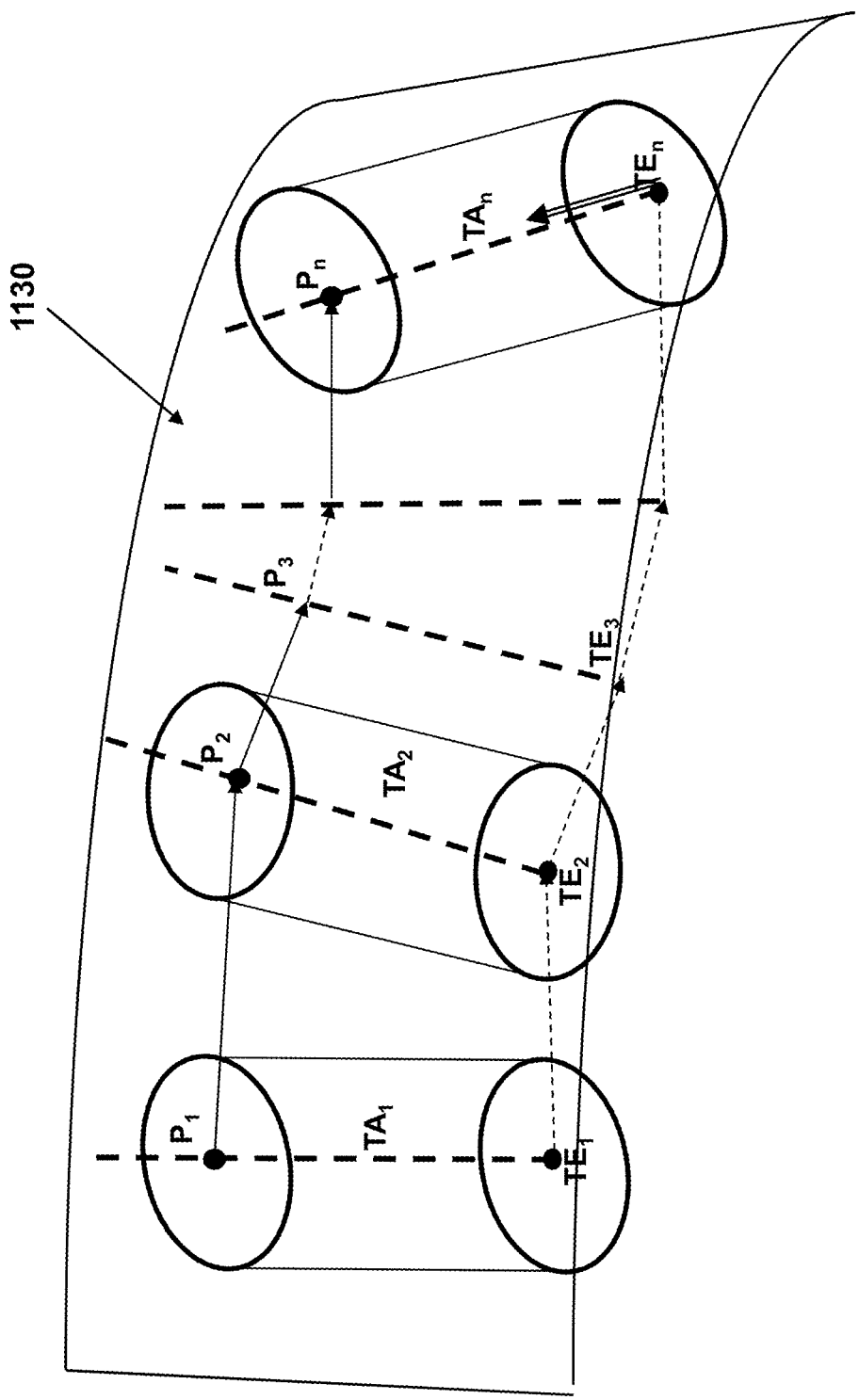
FIG. 11 illustrates the cutter locations of the cutting tool with respect to a target surface area and interaction between tool position and the target.

FIG. 11 illustrates the cutter locations of the cutting tool with respect to a target surface area and interaction between tool position and the target, where a target surface 1130 is depicted as being created after the stock is continuously eroded by the cutting tool, by means of the cutting action of the cutting tool.

Figure 12A:
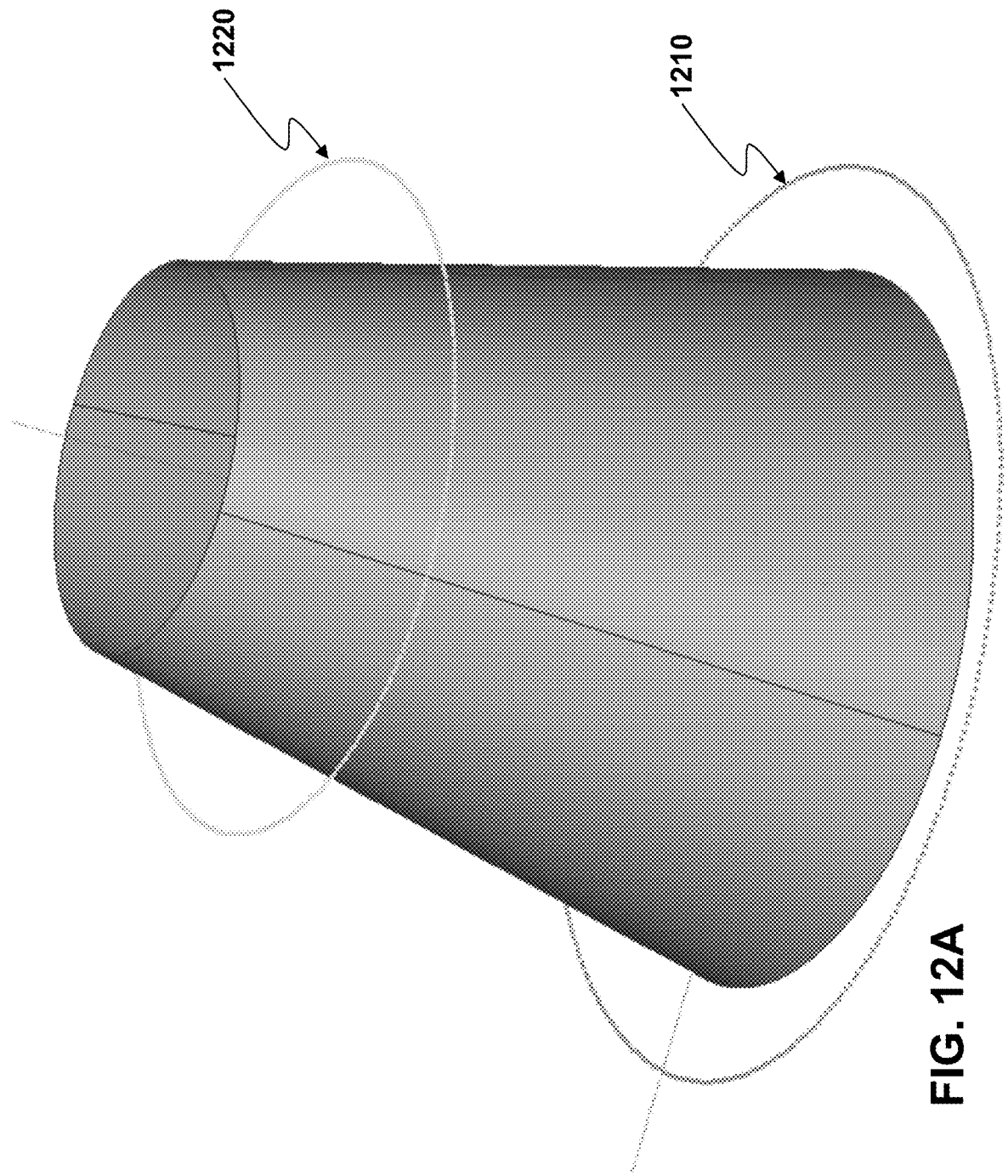
FIGS. 12A-12B show an example display of the tool ends and pivots relative to a 5-axis toolpath.
Figure 12B:
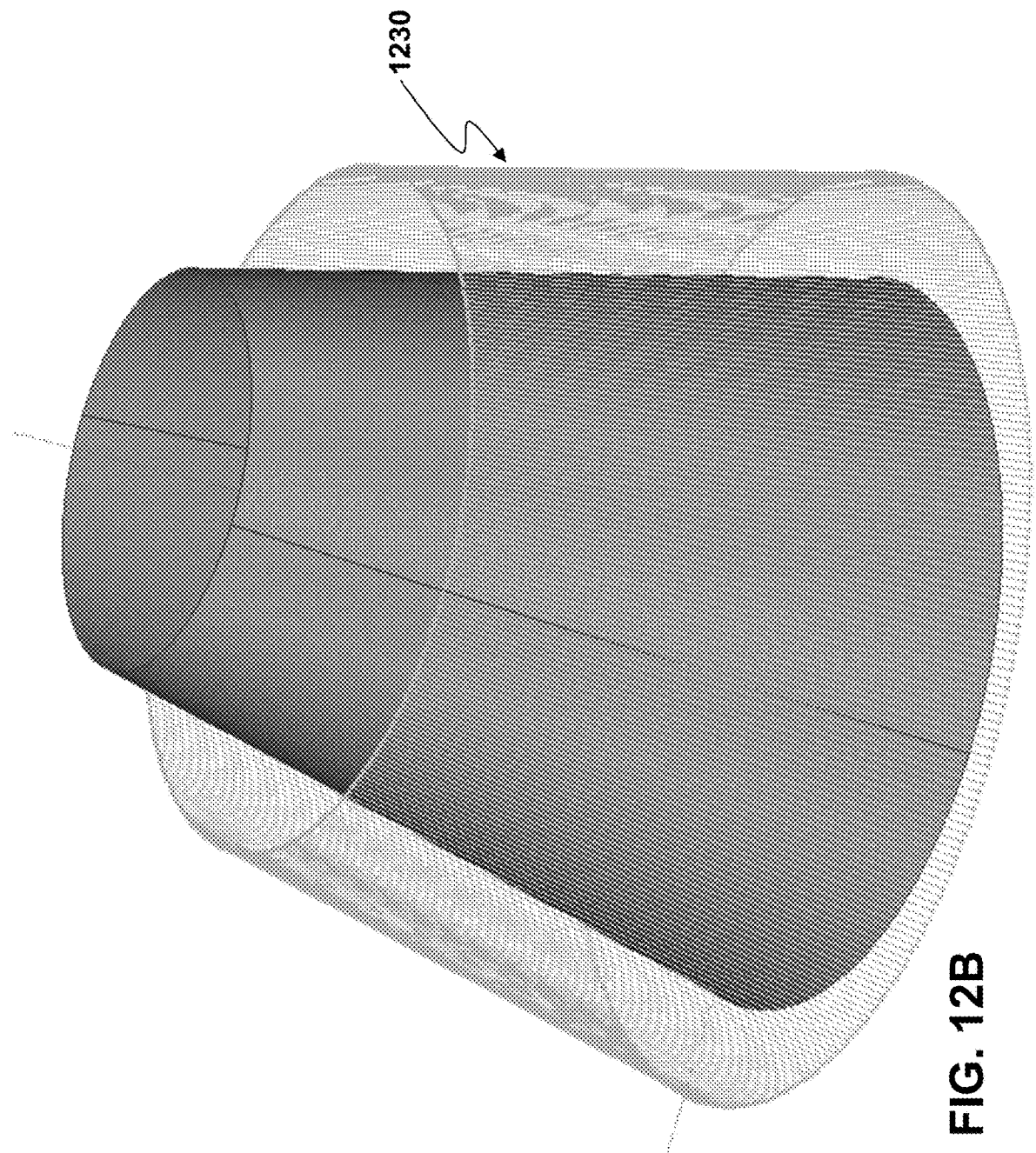

FIGS. 12A-12B show an example display of the TEs 1210 and pivots 1220 relative to a 5-axis toolpath where FIG. 12A depicts a collection of tool ends and the associated pivots relative to a 5-axis toolpath. FIG. 12B shows the same toolpath with the vectors showing the tool axes vectors 1230. It is noted that the cutting tool is not displayed in these figures.

Figure 13B:
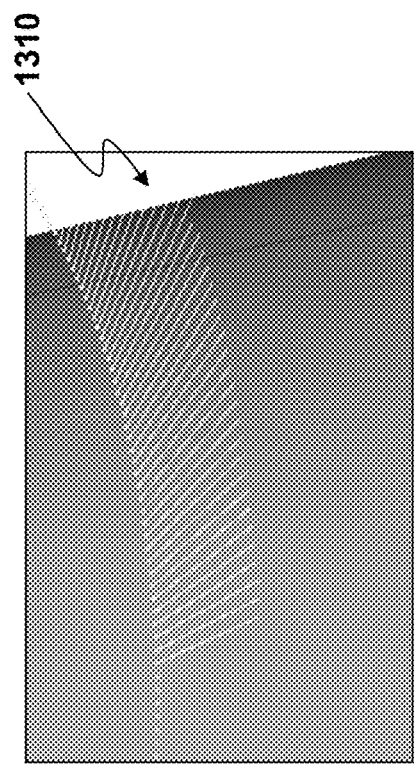
FIGS. 13A-13C further illustrate the same workpiece model but now showing a number of pivot velocity vectors.
Figure 13C:
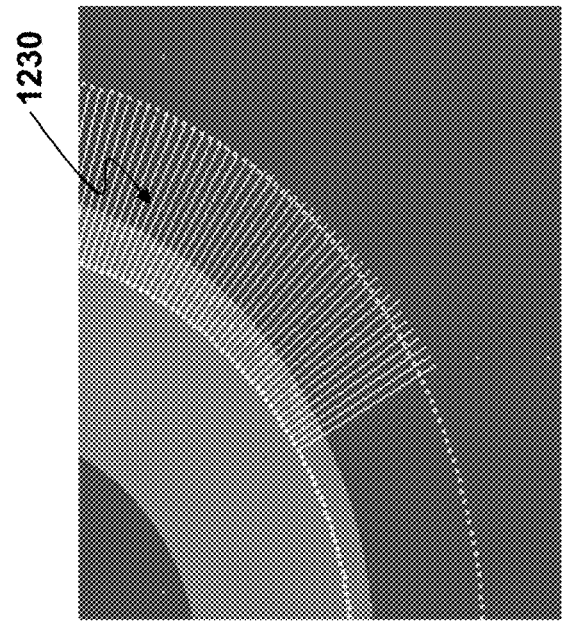
Figure 13A:
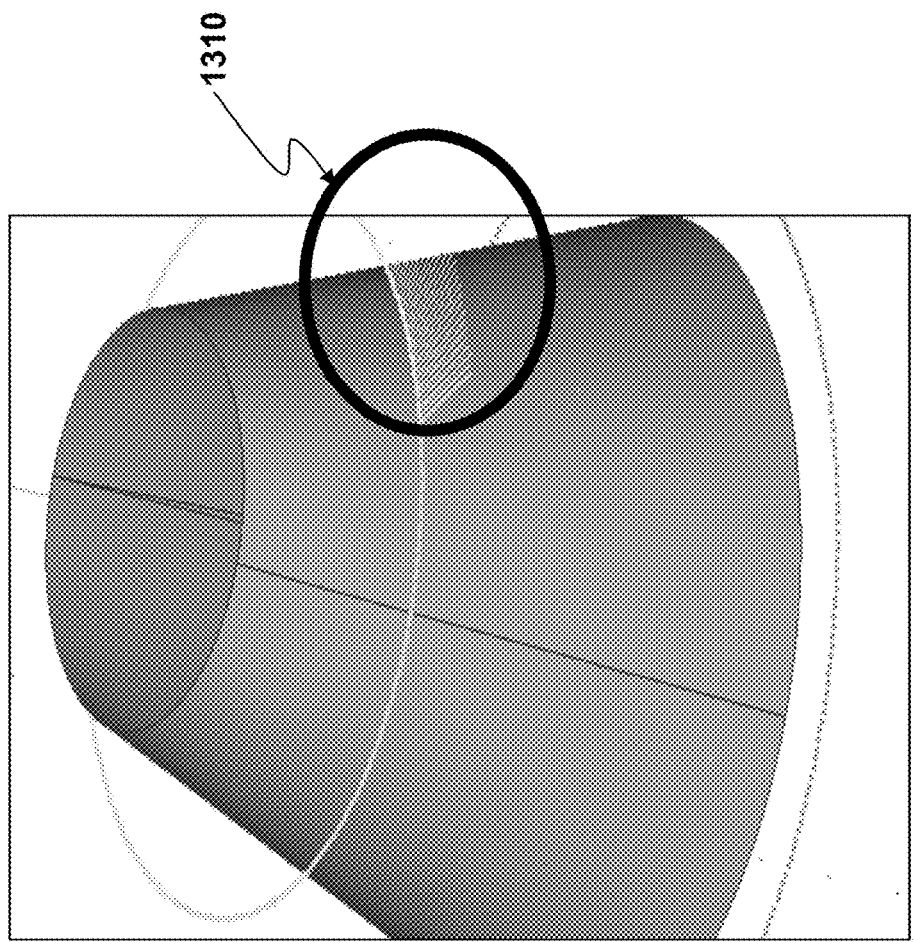

FIGS. 13A-13C further illustrate the same workpiece model but now showing a number of pivot velocity vectors 1310 that are then further shown in more detail in FIG. 13B showing a zoomed in version of the circled portion of FIG. 13A. Further, FIG. 13C shows a cross-sectional view of the x y axis as to the difference in length between the arrows denoting the pivot velocity vectors. In one aspect of the example toolpath virtualization and optimization system, the pivot velocity vectors highlight the motion produced by the CT and provide a tool to detect such motions during the toolpath simulation phase (where the user is still able to change parameters of the calculated toolpath in order to avoid such relative motion). In one embodiment, the difference in length between adjacent arrows may indicate a consistent relative motion of the pivot points with respect to the tool ends. That is, the present systems provide a method for detecting zones of the toolpath where such relative motion occurs, where such motion typically has a negative effect on the kinematics of the rotary axis of the milling machine and may hence impair the final quality of the finished cut model. Accordingly, the pivot velocity vectors of FIGS. 13A-C 1310 may emphasize that kind of motion and provide a method to detect such motion.

Figure 15:
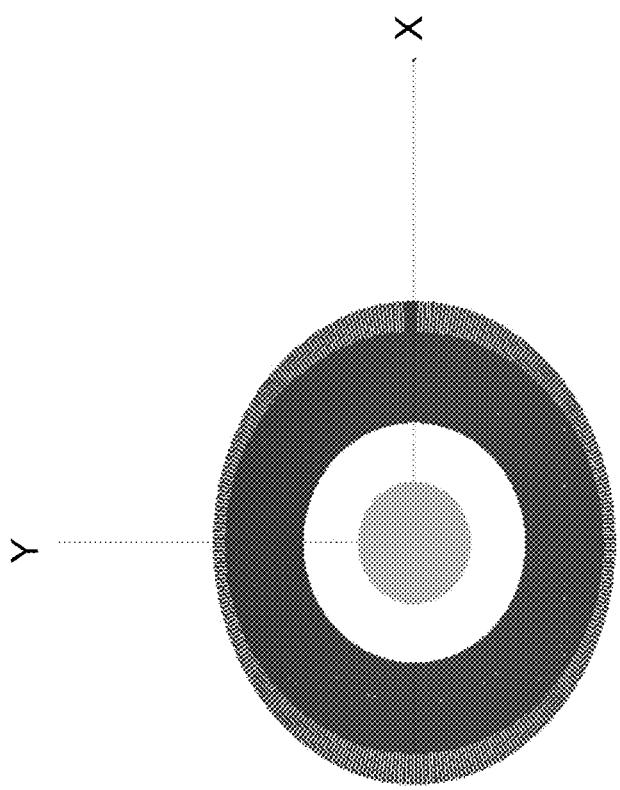
FIG. 15 further illustrates the pivot velocity vectors as determined based on visualization of related kinematic data.
Figure 18:
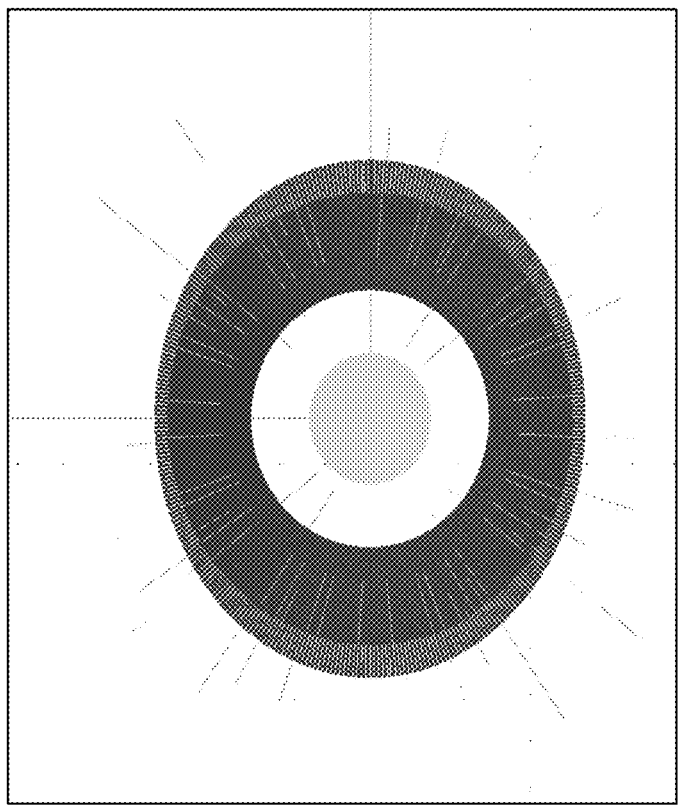
FIGS. 17, 18, and 19A-D illustrate some examples of visually displayed pivot velocities, accelerations, and jerks.
Figure 17:
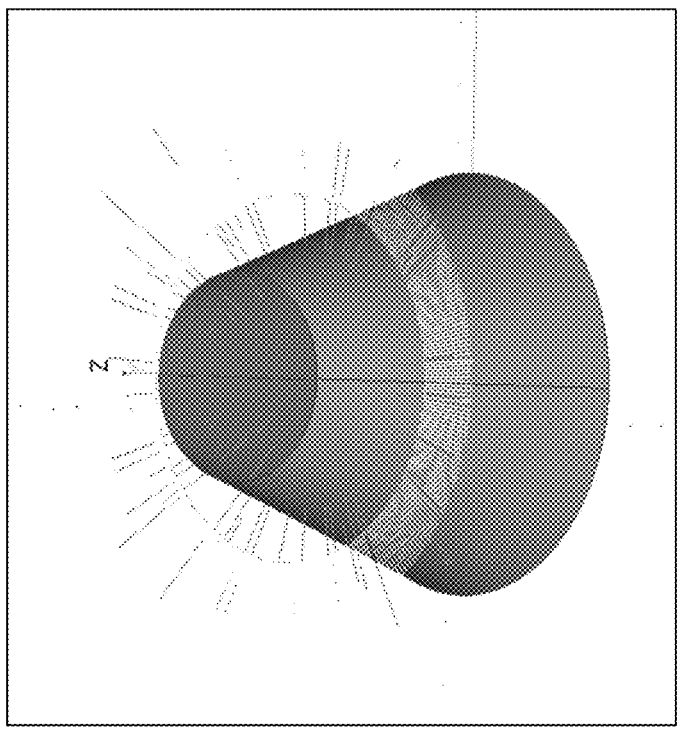
Figure 19A:
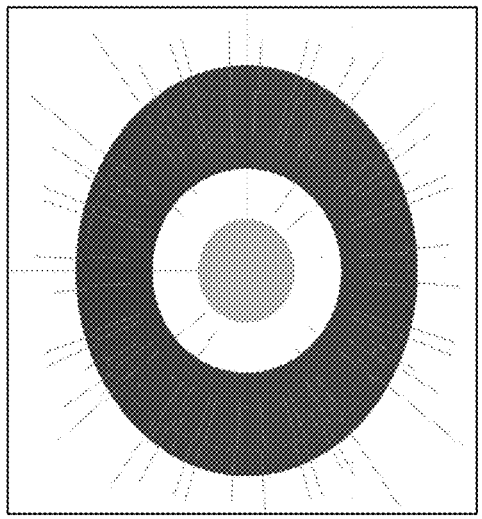
Figure 19B:
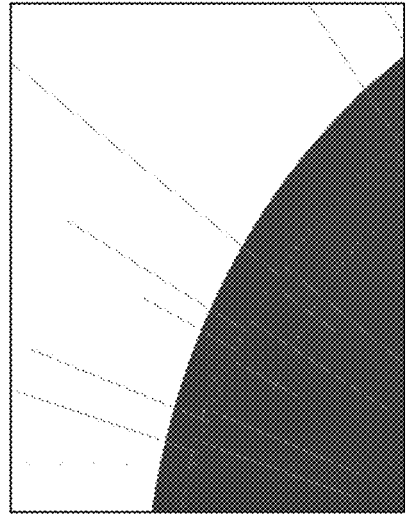
Figure 19C:
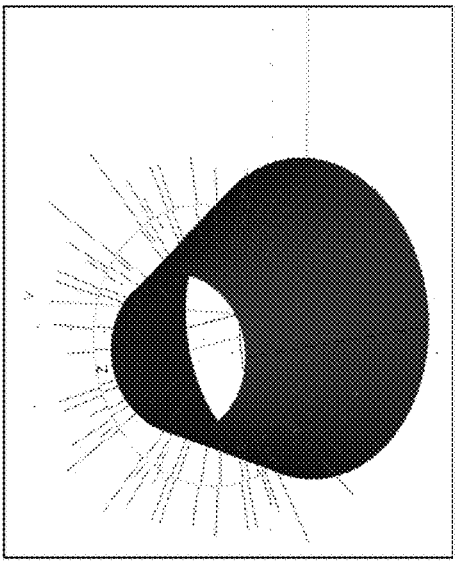
Figure 19D:
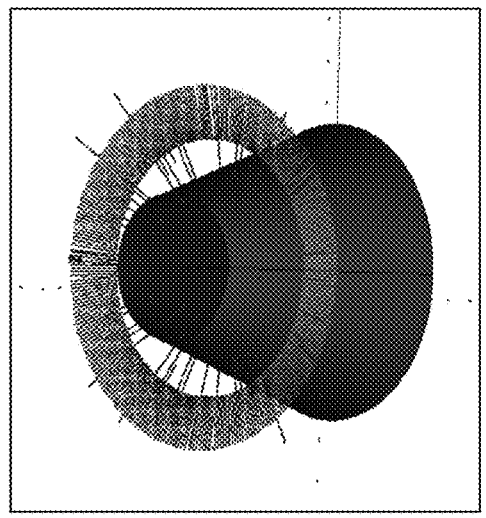
Figure 20:
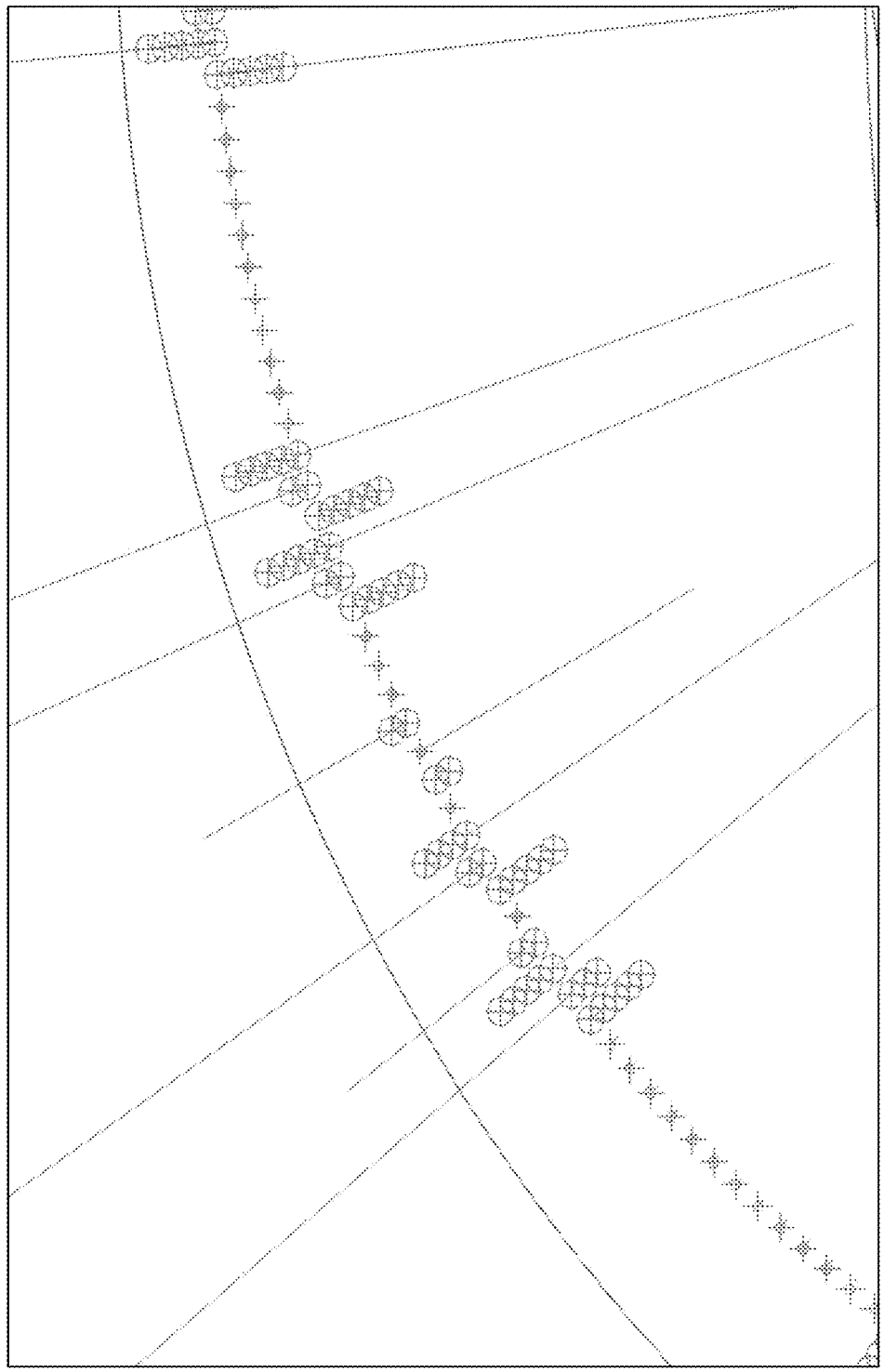
FIGS. 20-25 further illustrate the jerk visualization determined by the toolpath virtualization and optimization system.
Figure 21:
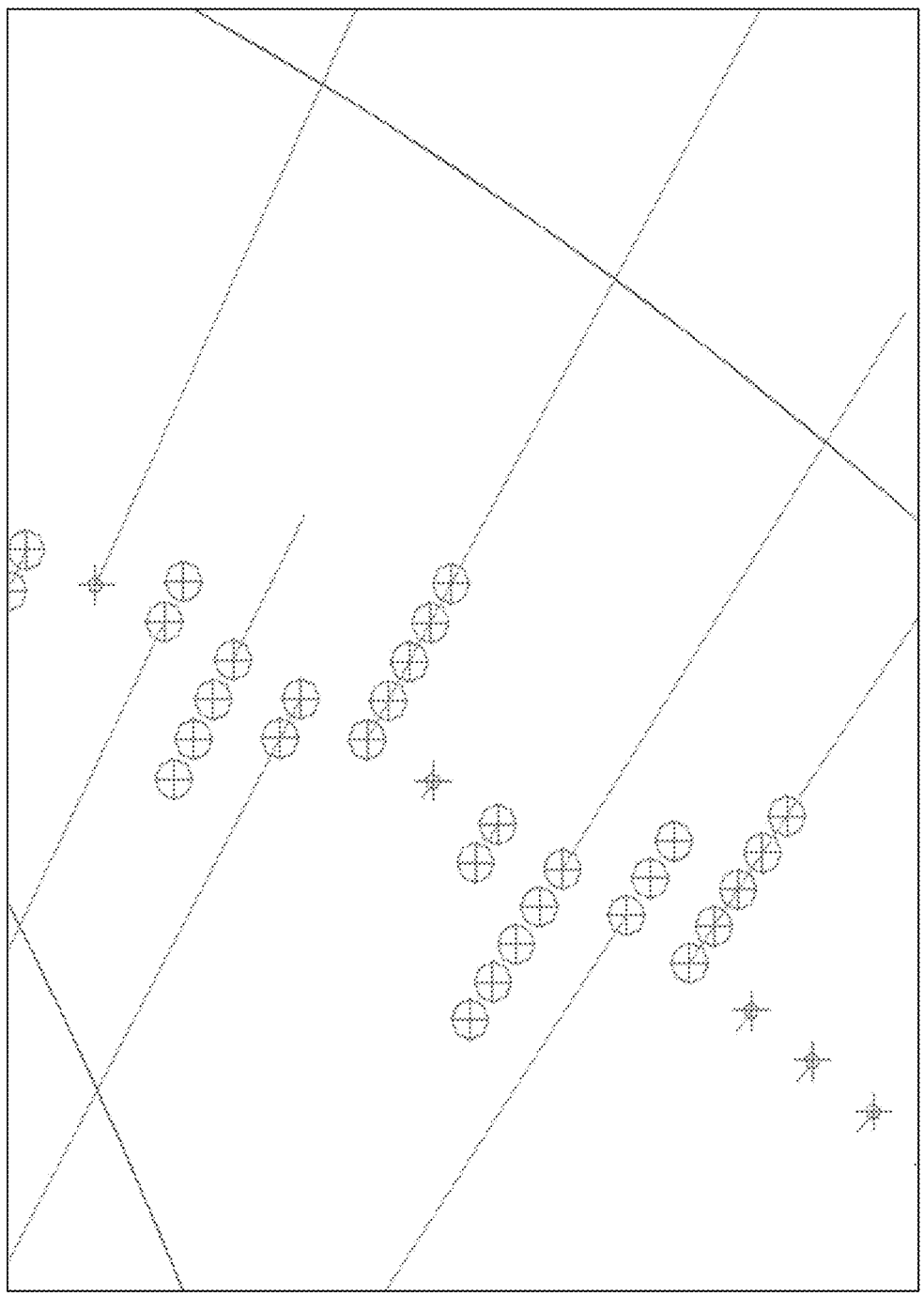
Figure 22:
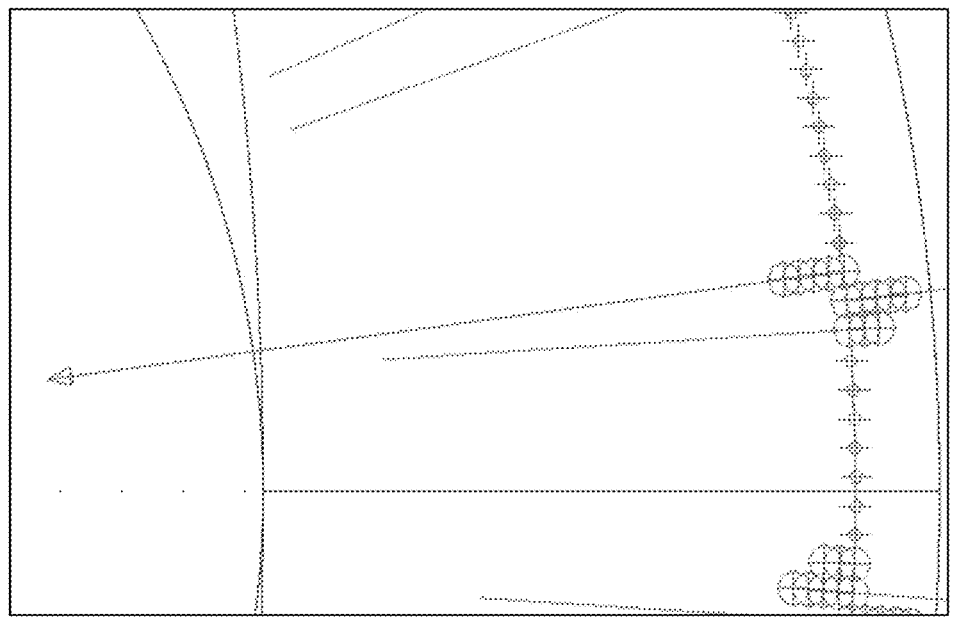
Figure 23:
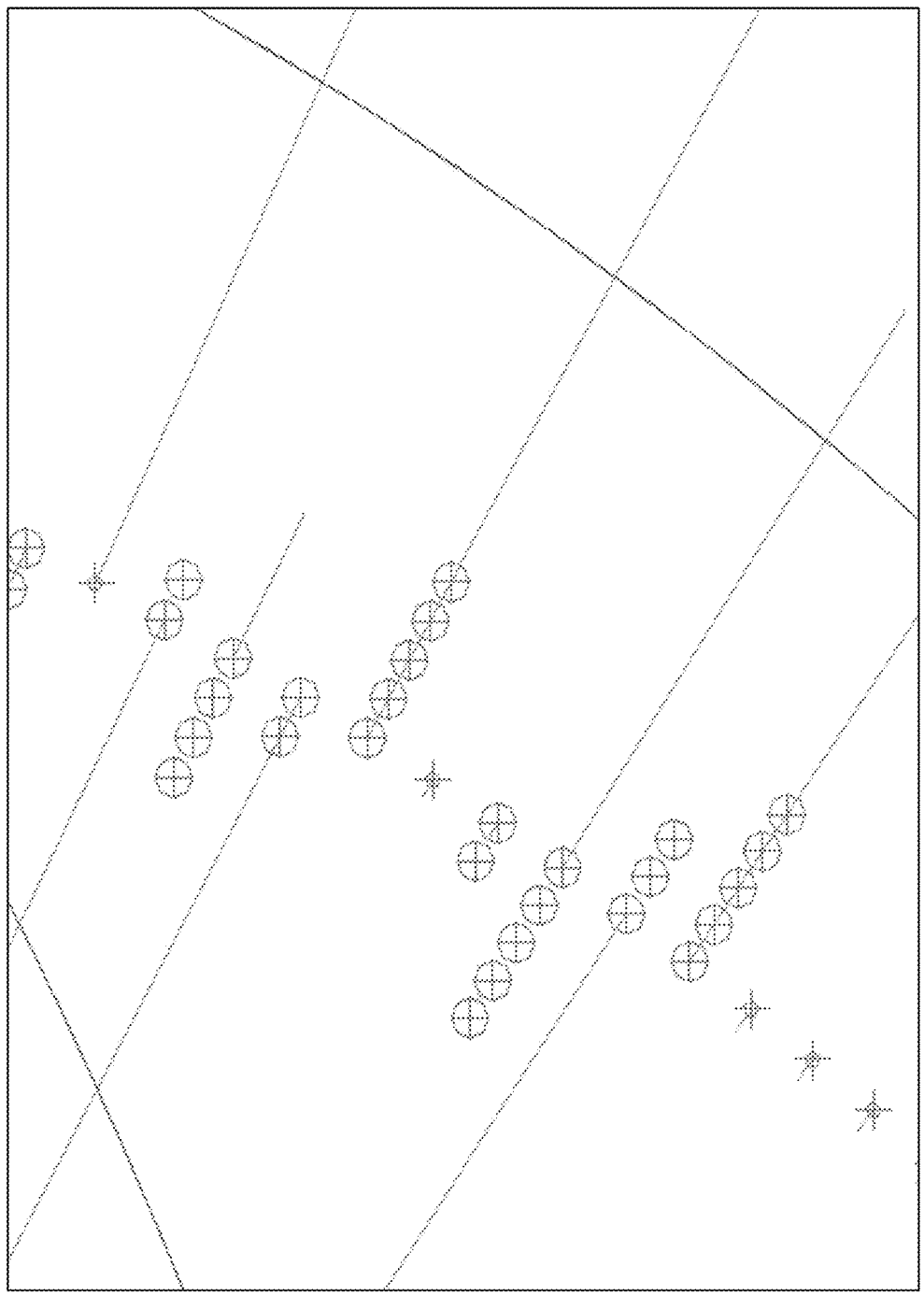
Figure 24:
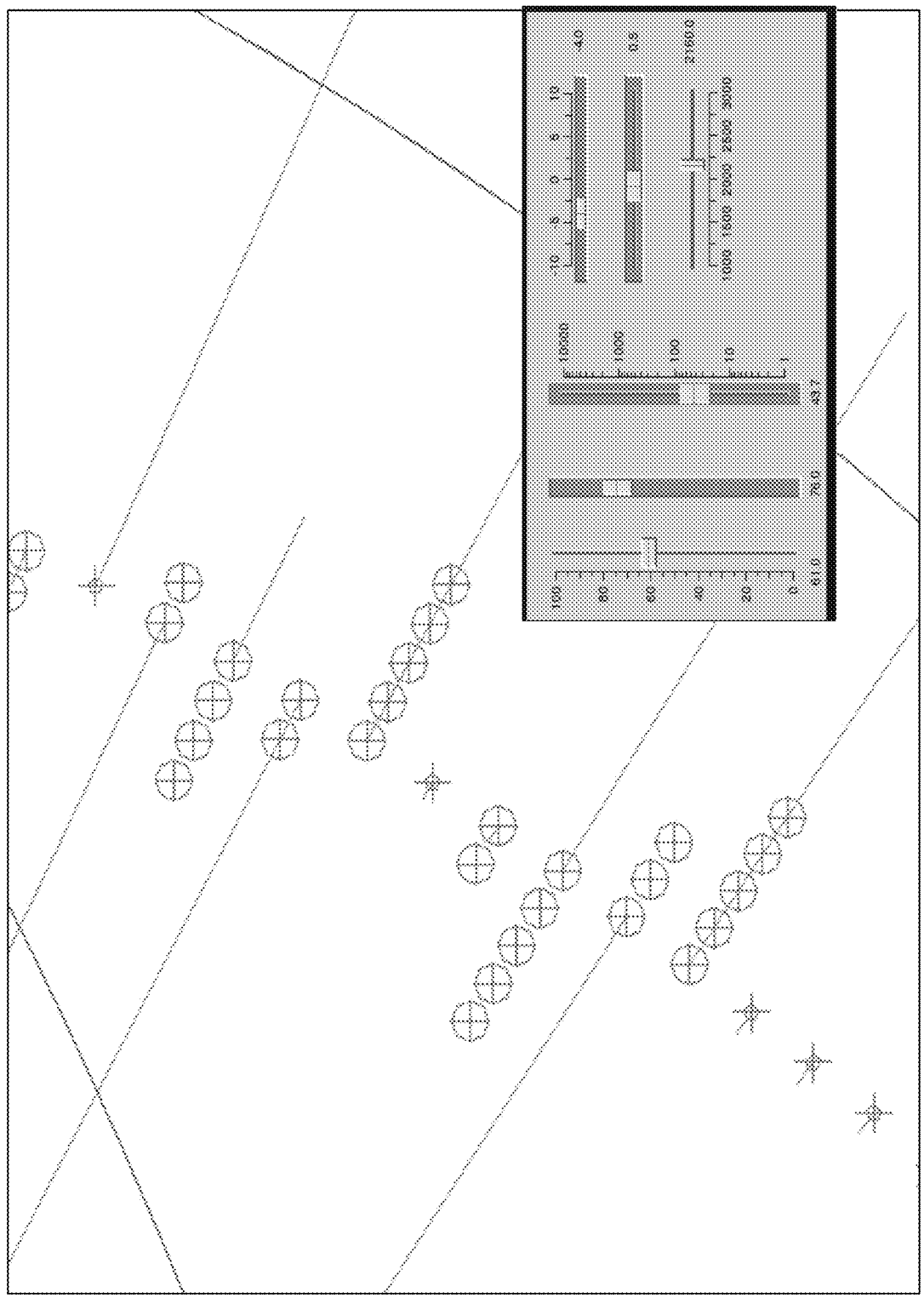
Figure 25:
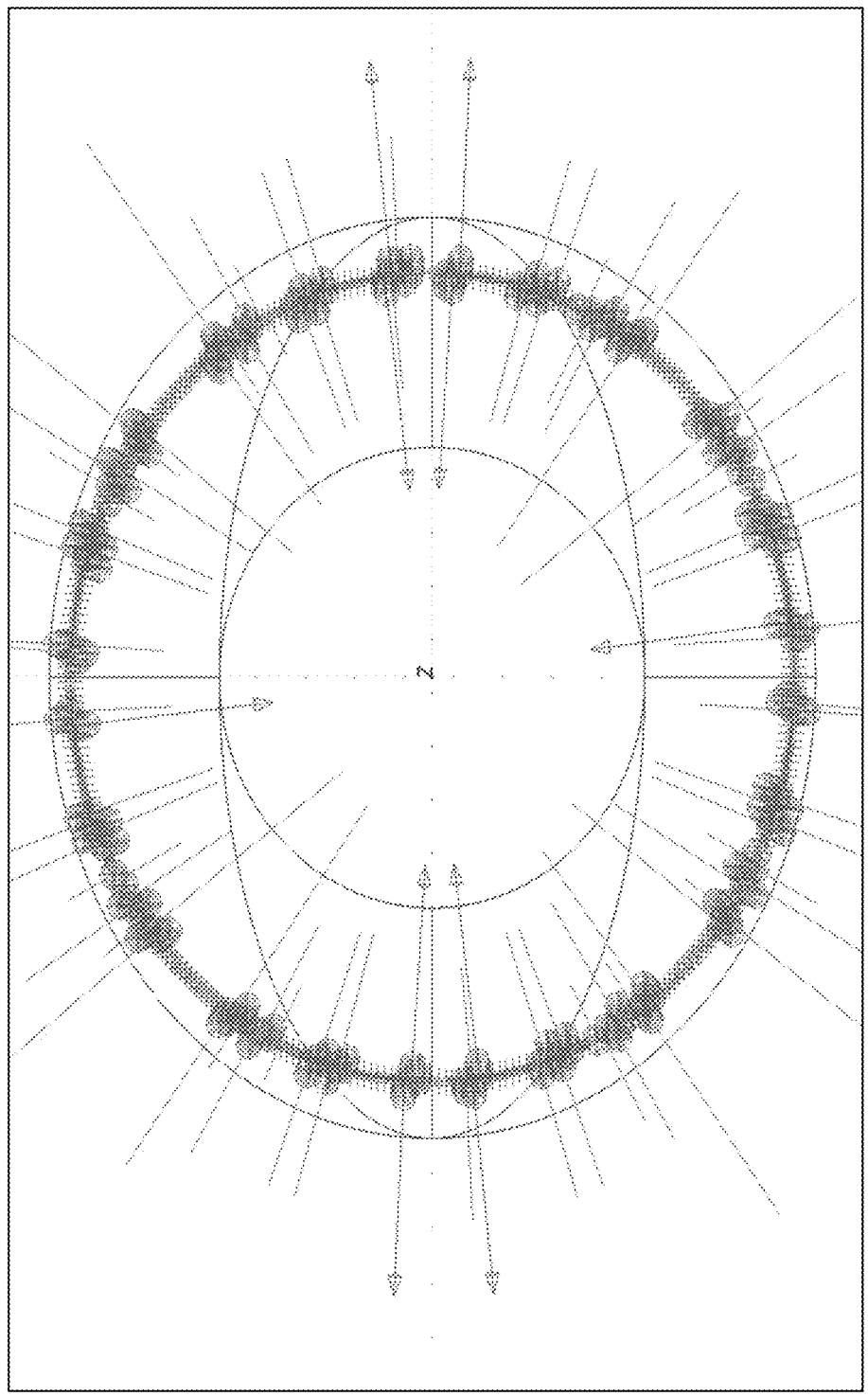

FIGS. 14 and 15 illustrate the pivot velocity vectors 1410 as determined based on visualization of related kinematic data, where tool axes vectors 1420 are also depicted in FIG. 14. With further reference to FIG. 14, the workpiece is shown in an axonometric view and FIG. 15 shows the same workpiece in an orthogonal view or cross-sectional x y view. The axonometric view depicts the tool axes arrows along with difference in length between adjacent pivot velocity vectors.

Aspects of the present embodiments disclose additional attributes necessary for the toolpath virtualization and optimization system. An acceleration of the pivot may be determined based on the velocity and TE of the subsequent and current cutting locations. That is, the acceleration for a particular CL of the CT may be based on the determined velocity of the subsequent location and the velocity of the current location (e.g. $V_{j+1}-V_j$), along with the TE immediately following the location of the subsequent location of the current TE and the TE at the current location (e.g., $TE_{j+2}-TE_j$), as depicted in the example formulas presented below:

$Aj=(V_{j+1}-V_j)/(|TE_{j+2}-TE_j|)$ where $A_j$=Acceleration of Pivot$_j$ with respect to the corresponding TE$_j$ $Jj=(A_{j+1}-A_j)/(|TE_{j+3}-TE_j|)$ where $J_j$=Jerk of Pivot$_j$ with respect to the corresponding TE$_j$ The TE difference may be represented as the modulus of the difference vector. Additionally, a jerk of the pivot may be determined based on the determined acceleration of the subsequent location and the acceleration of the current location (e.g., $A_{j+1}-A_j$) and further based on the TE of the current location and the TE immediately following the location of the subsequent location after the current location (e.g., $TE_{j+3}-TE_j$). As discussed previously, since the denominators have dimension of length, length$^2$, or length$^3$ instead of time, time$^2$, or time$^3$, these are not acceleration and jerk in the physical sense. The length of the TE's motion is intended to play the role of a time variable. Note also $A_j$ and $J_j$ might be negative since their numerators can change sign (not their denominators, which are always non-negative).

Additionally, by using the $\omega j$ (defined previously), a direction in 3D space may be associated with $A_j$ and $J_j$ by defining the vectors:

Qj=Aj $\omega j$, where Qj has a length which is equal to the scalar value Aj: it will be displayed (issued in Pj) as a visual measure of the relative acceleration of the pivot point Pj with respect to the tool end TEj Rj=Jj $\omega j$, Rj has a length which is equal to the scalar value Jj: it will be displayed (issued in Pj) as a visual measure of the relative jerk of the pivot point Pj with respect to the tool end TEj FIGS. 16A-16B show the velocity vectors, acceleration vectors, and jerk vectors at each CL, 1, 2, 3, ..., n. In some embodiments, the Jerk may be omitted from display as the velocity and acceleration vectors are used by the toolpath virtualization and optimization system. That is, the toolpath virtualization and optimization system may use such data before or during (e.g., in real-time) the CNC phase where the machine receives the data and begins the physical cutting/machining of the workpiece.

The present embodiments address the functionality of the toolpath virtualization and optimization system. Some aspects of the examples provided are related to how the virtualization model may be affected based on the numerical values of each of the velocity, acceleration, and jerk vectors. For example:

If $|TE_{j+1}-TEj|$ is zero then $|P_{j+1}-P_j|$ cannot vanish (otherwise a double CL would have been produced, which is useless for the cycle toolpath): in such case Vj is assigned a conventional maximum full-scale value $Vj_{MAX}$.

If $|TE_{j+1}-TE_j|$ vanishes, also $TE_{j+2}-TE_j$ could: in such case, assuming the same convention as for Vj, Aj is assigned a conventional maximum full-scale value $Aj_{MAX}$. Vanishing of $|TE_{j+2}-TE_j|$ without vanishing of $|TE_{j+1}-TE_j|$ corresponds to a 180° turn in the cycle toolpath which is usually avoided by CAM systems: in such case the zero value of $|TE_{j+2}-TE_j|$ can be conveniently replaced by the nonzero $|TE_{j+1}-TE_j|$.

If $|TE_{j+1}-TE_j|$ and $TE_{j+2}-TE_j|$ both vanish, also $|TE_{j+3}-TE_j|$ could: in such case, assuming the same convention as for Vj and Aj, Jj is assigned a conventional maximum full-scale value $Jj_{MAX}$.

Vanishing of $|TE_{j+3}-TE_j|$ without vanishing of both $|TE_{j+1}-TE_j|$ and $|TE_{j+2}-TE_j|$ can happen: in such case the zero value of $|TE_{j+3}-TE_j|$ can be conveniently replaced by the largest value among $|TE_{j+1}-TE_j|$ and $TE_{j+2}-TE_j|$.

FIGS. 17, 18, and 19A-D illustrate some examples of visually displayed pivot velocities, accelerations, and jerks in various combinations for a real CAD CAM model. FIGS. 20-25 further illustrate the jerk visualization determined by the toolpath virtualization and optimization system.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method for determining an optimized toolpath in a computer-aided manufacturing (CAM) system, wherein the optimized toolpath comprises a toolpath associated with a part of a workpiece and wherein the optimized toolpath is configured for a computer numerical control (CNC) machine, the method comprising:
   determining a set of parameters associated with a cutting tool of the CNC machine, the set of parameters comprising pivot, velocity, accelerations, and jerk, wherein the determining is based on kinematic properties of a cutting tool of the CNC machine and a toolpath, wherein the kinematic properties of the cutting tool are based on an associated tool end, tool length, and tool axis;
   determining a cutting tool positioning and a cutting tool movement for performing a machine operation, wherein the determining of the cutting tool positioning and the cutting tool movement is based on the determined set of parameters associated with the CNC machine;
   performing a capability check for the cutting tool positioning and the cutting tool movement based on capabilities of the CNC machine and the cutting tool;
   determining an optimized toolpath having a consistent motion of the cutting tool based on the performed capability check and adjusting one or more of the set of parameters, wherein the optimized toolpath is based on the jerk of the cutting tool being below a threshold; and
   transmitting the determined optimized toolpath for generating the machine operation in the CNC machine.

2. The method of claim 1 further comprising:
   providing precise indications about the quality of manufacturing and part finishing.

3. The method of claim 1 wherein the pivot is determined based on a tool end, cutting tool length, and axial inclination of the cutting tool.

4. The method of claim 1 wherein a pivot displacement is the difference between a current pivot and a previous pivot.

5. The method of claim 4 wherein the velocity is determined based on a ratio of the length of the pivot displacement and a tool end displacement.

6. The method of claim 5 wherein the tool end displacement is the difference between a current tool end and a previous tool end.

7. The method of claim 1 wherein the set of optimization rules is at least one of: a set of rules to minimize tool velocity, a set of rules to minimize tool jerk, and a set of rules to minimize tool acceleration.

8. The method of claim 1 further comprising:
   performing the generated machine operation by the CNC machine.

9. The method of claim 8 wherein performing the generated machine operation by the CNC machine is based on a successful determination of the optimized toolpath.

10. A device comprising:
    a processor and addressable memory, the processor configured to:
       determine a set of parameters associated with a computer numerical control (CNC) machine, the set of parameters comprising pivot, velocity, accelerations, and jerk, wherein the determining is based on kinematic properties of a cutting tool of the CNC machine and a toolpath, wherein the kinematic properties of the cutting tool are based on an associated tool end, tool length, and tool axis;
       determine a cutting tool positioning and a cutting tool movement for performing a machine operation, wherein the determining of the cutting tool positioning and the cutting tool movement is based on the determined set of parameters associated with the CNC machine;
       perform a capability check for the cutting tool positioning and the cutting tool movement based on capabilities of the CNC machine and the cutting tool;
       determine an optimized toolpath having a consistent motion of the cutting tool based on the performed capability check and adjusting one or more of the set of parameters, wherein the optimized toolpath is based on the jerk of the cutting tool being below a threshold; and
       transmit the determined optimized toolpath for generating the machine operation in the CNC machine.

11. The device of claim 10, wherein the processor is further configured to:
    provide precise indications about the quality of manufacturing and part finishing.

12. The device of claim 10, wherein the processor is further configured to:
    perform the generated machine operation by the CNC machine based on a successful determination of the optimized toolpath.

13. A computer-aided manufacturing (CAM) system comprising a virtual machine toolpath optimization component and a positioning movement component, each comprising a processor and addressable memory;
    wherein the positioning movement component processor is configured to:
       determining a set of parameters associated with a computer numerical control (CNC) machine, the set of parameters comprising pivot, velocity, accelerations, and jerk, wherein the determining is based on kinematic properties of a cutting tool of the CNC machine and a toolpath, wherein the kinematic properties of the cutting tool are based on an associated tool end, tool length, and tool axis; and determining a cutting tool positioning and a cutting tool movement for performing a machine operation, wherein the determining of the cutting tool positioning and the cutting tool movement is based on the determined set of parameters associated with the CNC machine; and wherein, the virtual machine toolpath optimization component processor is configured to:

perform a capability check for the cutting tool positioning and the cutting tool movement based on capabilities of the CNC machine and the cutting tool;

determine an optimized toolpath having a consistent motion of the cutting tool based on the performed capability check and adjusting one or more of the set of parameters, wherein the optimized toolpath is based on the jerk of the cutting tool being below a maximum threshold;

transmitting a notification of a dangerous point of the toolpath to a user when the order of magnitude of the jerk is beyond the maximal threshold; and transmit the determined optimized toolpath for generating the machine operation in the CNC machine.

14. The CAM system of claim 13, further comprising:

a toolpath virtualization and optimization system, wherein the toolpath virtualization and optimization system is configured to:

determine an optimized toolpath in the CAM system, wherein the optimized toolpath comprises a toolpath associated with a part of a workpiece and wherein the optimized toolpath is configured for CNC machine.

* * * * *